(12) United States Patent
Omiya et al.

(10) Patent No.: US 7,102,831 B2
(45) Date of Patent: Sep. 5, 2006

(54) LENS BARREL, PHOTOGRAPHIC APPARATUS, AND OPTICAL APPARATUS

(75) Inventors: Akio Omiya, Saitama (JP); Takehiko Senba, Asaka (JP); Hiroshi Endo, Asaka (JP); Yoshihiro Ito, Asaka (JP)

(73) Assignees: Fujinon Corporation, Saitama (JP); Fuji Photo Film Co., Ltd., Kanagawa (JP)

( * ) Notice: Subject to any disclaimer, the term of this patent is extended or adjusted under 35 U.S.C. 154(b) by 3 days.

(21) Appl. No.: 10/967,670

(22) Filed: Oct. 19, 2004

(65) Prior Publication Data

US 2005/0185297 A1 Aug. 25, 2005

(30) Foreign Application Priority Data

Feb. 23, 2004 (JP) .............................. 2004-046645
Mar. 5, 2004 (JP) .............................. 2004-062707
Sep. 24, 2004 (JP) .............................. 2004-278312

(51) Int. Cl.
*G02B 15/14* (2006.01)
*G03B 5/02* (2006.01)

(52) U.S. Cl. ....................... 359/704; 359/702; 396/349

(58) Field of Classification Search ........ 359/699–704, 359/823; 396/349, 350
See application file for complete search history.

(56) References Cited

U.S. PATENT DOCUMENTS 5,570,149 A * 10/1996 Wakabayashi et al. ........ 396/85
5,734,937 A * 3/1998 Katoh et al. ................... 396/87
6,008,954 A * 12/1999 Shintani et al. ............. 359/704
6,853,499 B1 * 2/2005 Iwasaki ....................... 359/694

FOREIGN PATENT DOCUMENTS

JP 2003-295031 A 10/2003

OTHER PUBLICATIONS

Discover Originality High Technology Grand Prix 17th Excellent Research Paper, Special Prize for the 70th Anniversary of the birth of Nihon Kogyo Shimbun, "Technique Used in Super-slim Digital Camera OptioS", Mr. Hiroshi Nomura, et al.

* cited by examiner

*Primary Examiner*—Ricky Mack
*Assistant Examiner*—M. Hasan
(74) *Attorney, Agent, or Firm*—Sughrue Mion, PLLC

(57) ABSTRACT

A lens barrel has its collapsed length that can be further decreased by removing unnecessary space and bringing lens groups close to each other and a photographic apparatus incorporates the lens barrel. When the lens barrel is collapsed, at least a fourth lens group is retracted from a photographic optical axis by an advance/retract mechanism. In that case, a first lens group and third lens group are aligned along the optical axis and stuffed into the lens barrel, the fourth lens group is placed on the top, bottom, right, or left side of these lenses, and a second lens group is placed on the top, bottom, right, or left side of the first and third lens groups. This reduces the length of the lens barrel. During extension, the second and fourth lens groups are advanced onto the photographic optical axis by the advance/retract mechanism to extend the lens barrel greatly.

34 Claims, 43 Drawing Sheets

LENS BARREL, PHOTOGRAPHIC APPARATUS, AND OPTICAL APPARATUS

BACKGROUND OF THE INVENTION

1. Field of the Invention

The present invention relates to a lens barrel which holds a zoom lens consisting of multiple lens groups, to a photographic apparatus which takes photographs by capturing light from a subject entering through the zoom lens held by the lens barrel, and to an optical apparatus which includes a lens consisting of multiple lens.

2. Description of the Related Art

Recently, digital cameras have been spreading rapidly, and increasingly higher image quality is demanded together with smaller size and thinner profiles. A thin card-size digital camera equipped with a lens barrel which holds a zoom lens consisting of multiple lens groups has been proposed and introduced commercially as one of digital cameras which meet the above needs. This camera is capable of high image quality zooming using optical zoom whereas earlier thin digital cameras use an electronic zoom function for magnification.

One of the trends in user needs is to have higher-powered optical zoom capabilities while achieving smaller size and thinner profiles.

Patent Document (Japanese Patent Laid-Open No. 2003-295031) proposes a technique for collapsing a lens barrel equipped with a zoom lens composed of four lens groups in a thin camera body using an ingenious method for forming cam grooves.

An internal configuration of the lens barrel disclosed in Patent Document 1 is described below.

FIGS. 1, 2, and 3 are sectional views taken along the optical axis of the lens barrel mounted in a digital camera. Of these, FIGS. 1 and 2 show the lens as it is extended. According to Patent Document 1, FIG. 1 is a diagram showing a telephoto end while FIG. 2 is a diagram showing a wide-angle end. FIG. 3 is a diagram showing the lens barrel as it is collapsed. FIG. 4 is a developed view illustrating cam grooves used to extend and collapse the lens barrel from/into the camera body.

A configuration of a lens barrel 100 is described with reference to FIGS. 1 to 4.

The lens barrel 100 holds a four-group zoom lens composed of a first lens group 210, second lens group 220, third lens group 230, and fourth lens group 240. Of the four lens groups, the second lens group 220 is moved along the optical axis for adjustment of focal distance while the fourth lens group 240 serving as a focus lens is moved along the optical axis for focus adjustment.

The first lens group 210 is held in an inner tube 110. The inner tube 110 is equipped with cam pins 111, which are engaged with cam grooves 121 (see FIG. 4) formed in the inner surface of an outer tube 120. Three cam pins 111 are installed on the outer wall of the inner tube 110 at unequal intervals and three cam grooves 121 are formed on the inner wall of the outer tube 120 at unequal intervals (see FIG. 4) to engage with the cam pins 111. Consequently, when rotation of a zoom motor 270 is transmitted to a gear 124 installed on the inner wall of the outer tube 120 via a coupling gear 271 (see FIG. 2), rotating the outer tube 120, the first lens group 210 extends together with the inner tube 110 following the shape of the cam grooves 121.

The second lens group 220 is held by a lens group holding frame 221, on whose circumference three cam pins 222 are installed at unequal intervals. The cam pins 222 are engaged with respective cam grooves 122 formed in the inner wall of the outer tube 120 (see FIG. 4). A guide rod 1132 is passed through a through-hole 221a made in the lens group holding frame 221 of the second lens group 220. Along with rotation of the outer tube 120, the second lens group 220 moves along the optical axis, being guided by the guide rod 1132. The guide rod 1132 is supported by a tip support 1132a while a guide rod 1133 which guides the third lens group 230 is supported by another tip support 1133a. The tip supports 1132a and 1133a support the respective guide rods 1132 and 1133 and are also used as members which support the inner tube 110. The tip supports 1132a and 1133a are equipped with an intermediate frame 1101 and a retainer ring 1102. The intermediate frame 1101 is inserted slidably along the inner wall of the inner tube 110 and the retainer ring 1102 is installed at the rear end of the inner tube 110 to prevent the intermediate frame 1101 from moving backward. The intermediate frame 1101 and retainer ring 1102 are equipped with respective spring pegs 1101a and 1102b. A spring 1103 is bridged between the spring pegs to restrict the movement of the intermediate frame 1101 by urging the intermediate frame 1101 forward along the sliding surface so that the intermediate frame 1101 will not move backward when it is extended together with the inner tube 110.

Furthermore, a cam groove 123 (see FIG. 4) is formed between the cam grooves 121 and 122 in the outer tube 120 to engage with a cam pin (not shown) installed on a lens group holding frame 131 of the third lens group 230. Consequently, as the outer tube 120 rotates by receiving the driving force of the zoom motor 270 via the coupling gear 271 and gear 124 (see FIG. 2), the third lens group 230 moves along the optical axis following the shape of the cam groove 123. Incidentally, a shutter unit 131 is linked to the lens group holding frame 130 which holds the third lens group 230.

A through-hole 131a is made in the lens group holding frame 130 as in the case of the lens group holding frame 221. The guide rod 1132 is passed through the through-hole 131a. Furthermore, the guide rod 1132 is also passed through a through-hole 141a made in a lens group holding frame 140 which holds the fourth lens group 240 described later. In this way, this example employs a configuration in which the second lens group 220, third lens group 230, and fourth lens group 240 are guided by the common guide rod 1132 to avoid misalignment of optical axes.

Extension operation of the lens barrel 100 with this configuration is described in detail with reference to FIG. 4.

When the outer tube 120 is rotated by a zoom motor 270, the inner tube 110 extends from a collapsed state to an extended position (B-side end of the area indicated by symbol A) following the shape of the cam grooves 121 (area indicated by symbol A) and held at the extended position (area indicated by symbol B). Until the outer tube 120 is held at the extended position, the second lens group 220 moves along the area indicated by symbol C following the shape of the cam grooves 122 and reaches the end of the area indicated by symbol C when the inner tube 110 is extended to the extended position. As a zoom switch (not shown) is operated at this time, the second lens group 220 enters the area indicated by symbol D, and moves to the end of the area indicated by symbol D if the zoom switch continues to be operated. On the other hand, as the inner tube 110 rotates, the third lens group 230 leaves a collapsed position, moves along the cam groove 123 through an extension area (area indicated by symbol E) and reaches an extended position (intersection of areas indicated by symbols E and F). It remains held at the extended position (area indicated by symbol F) even if the zoom switch is operated.

In this way, by arranging cam grooves ingeniously in the inner wall of the outer tube 120, it is possible to move the first lens group, second lens group 220, and third lens group 230 among the four lens groups along the optical axis following the shape of the cam grooves by the rotation of the single tube 120 and move the second lens group along the optical axis by the operation of the zoom switch, and thereby carry out zooming.

In the lens barrel 100 shown in FIGS. 1 to 3, the fourth lens group 240 at the tail of the four lens groups composing the zoom lens is used as a focus lens. The zoom lens held in the lens barrel 100 has a high zoom ratio, and consequently the fourth lens group 240 acting as the focus lens must have a relatively long travel distance. Thus, in this example, a column screw 1131 (see FIG. 1) as long as the long travel distance is installed along the optical axis, a nut 141b is fastened to the lens group holding frame 140 which holds the fourth lens group 240, and the column screw 1131 is screwed into the nut 141b for accurate focus adjustment.

Focus is adjusted as the column screw 1131 is rotated by rotational driving force of a focus motor (not shown) transmitted via a gear train (not shown) and a lens group holding frame 141 moves along the optical axis by the distance equivalent to the rotation of the column screw 1131, being guided by the column screw 1131 and guide rods 1132 and 1133. When an image taking lens starts to catch a subject, focus is adjusted by generating image data by means of an image pickup device 280, detecting a focus position based on the image data, and moving the fourth lens group 240 acting as the focus lens to the focus position through rotation of the column screw.

After focus adjustment, when a shutter button (not shown) is pressed, the shutter unit 131 provided in the lens group holding frame 130 which holds the third lens group 230 is operated in synchronization with full depression of the shutter button to take a photograph. Consequently, light from the subject passes through the first lens group 210, second lens group 220, third lens group 230, and fourth lens group 240 (focus lens) and forms an image on a light-receiving surface of the image pickup device 280, which generates an image signal which represents the subject image formed on the light-receiving surface.

In this way, by arranging multiple cam grooves ingeniously in the inner wall of the outer tube, bringing the outer tube into cam engagement with the inner tube, and using the fourth lens group at the tail of the zoom lens as a focus lens, it is possible to implement a lens barrel which can be housed in a relatively slim body with its length relatively reduced when collapsed and can achieve a high zoom ratio when extended.

However, to move lens groups located forward along the optical axis, such as the first lens group and second lens group, a long distance during extension for a high zoom ratio and stuff the lens groups including the above lens groups as close together as possible into the lens barrel during collapse, it is necessary to provide enough collapsed length to keep the lens groups clear of each other as well as to provide enough extended length to extend the lens groups located forward along the optical axis, such as the first lens group and second lens group, as far ahead as possible. This inevitably makes the lens barrel a little longer, creating an unnecessary space in the collapsed lens barrel. This unnecessary space is concentrated around the guide rods and column screw stretching out along the optical axis to move the fourth lens group accurately along the optical axis.

SUMMARY OF THE INVENTION

The present invention has been made in view of the above circumstances and provides a lens barrel whose collapsed length can be further decreased as well as a photographic apparatus which incorporates the lens barrel into its body.

The present invention provides a first lens barrel which is extendable and collapsible and holds a zoom lens consisting of multiple lens groups, the lens barrel having:

a first lens group holding frame which holds a first lens group that is the foremost of the multiple lens groups composing the zoom lens and a second lens group holding frame which holds a second lens group that is the second foremost of the multiple lens groups composing the zoom lens, wherein:

the second lens group holding frame is spring-loaded forward along an optical axis, and the first lens group holding frame has a pushing section which pushes the second lens group holding frame along the optical axis during collapse and separates from the second lens group holding frame during extension.

In the first lens barrel according to the present invention, the first lens group holding frame pushes the second lens group holding frame during collapse. Consequently, the spring which urges the second lens group holding frame forward along the optical axis is compressed in such a way as to gather repulsive force, bringing the first lens group and second lens group close to each other. This eliminates unnecessary space between the first lens group and second lens group, further reducing the length of the lens barrel. Also, while the first lens group holding frame is separated from the second lens group holding frame, the second lens group is extended along the optical axis by the force of the spring more greatly than the extension by rotation of a rotating tube. This has the advantage of an increased zoom ratio.

This makes it possible to implement a lens barrel which can not only reduce its collapsed length, but also increase the zoom ratio by increasing the travel distance of the second lens group.

Preferably, the lens barrel has a fixed tube, a straight-ahead key member advanceably/retractably engaged with the fixed tube, a middle tube which rotatably engages with the straight-ahead key member and advances/retracts along with rotation due to cam engagement with the fixed tube, and a front tube which advanceably/retractably engages with the straight-ahead key member and advances/retracts along with rotation due to cam engagement with the middle tube, wherein the first lens group holding frame is fixed to the front tube.

This makes it possible to push the second lens group holding frame more securely by the front tube to which the first lens group holding frame is fixed.

Also, preferably the lens barrel has a second lens group supporting frame which advances/retracts along with rotation of the middle tube due to cam engagement with the middle tube, wherein the second lens group holding frame is supported by the second lens group supporting frame, being spring-loaded forward along an optical axis.

Thus, during extension or zooming, the zoom ratio is adjusted as the second lens group holding frame advances/retracts along the optical axis along with the rotation of the middle tube, being spring-loaded by the second lens group supporting frame. During collapse, the first lens group holding frame approaches the second lens group supporting frame and is housed in it while the second lens group holding frame gathers the spring force directed forward along the optical axis.

Furthermore, preferably the lens barrel has a second lens group retraction mechanism which retracts the second lens group from the optical axis of the zoom lens by turning the second lens group holding frame during collapse and advances the second lens group onto the optical axis during extension, wherein the pushing section pushes the retracted second lens group holding frame during collapse.

On the other hand, the present invention provides a first photographic apparatus which takes photographs by capturing light from a subject entering through a zoom lens consisting of multiple lens groups and held by an extendable/collapsible lens barrel, wherein:

the lens barrel has a first lens group holding frame which holds a first lens group that is the foremost of the multiple lens groups composing the zoom lens and a second lens group holding frame which holds a second lens group that is the second foremost of the multiple lens groups composing the zoom lens, the second lens group holding frame is spring-loaded forward along an optical axis, and the first lens group holding frame has a pushing section which pushes the second lens group holding frame along the optical axis during collapse and separates from the second lens group holding frame during extension.

Preferably, the photographic apparatus has an image pickup device which generates image signals by capturing light from a subject entering through the zoom lens held by the lens barrel.

Also, the present invention provides a second lens barrel which holds a zoom lens consisting of a first group, a second group, a third group, and a fourth group in this order when viewed from ahead along an optical axis, having:

a lens advance/retract mechanism which retracts at least the fourth lens group of the zoom lens from a photographic optical axis during collapse and advances the retracted lens group onto the photographic optical axis during extension.

In the second lens barrel according to this invention, the advance/retract mechanism which makes the fourth lens group advanceable/retractable can retract the fourth lens group from the photographic optical axis and put the fourth lens group on a different plane from the first lens group, second lens group, and third lens group arranged on the photographic optical axis. Naturally, to change the conventional mechanism (see FIGS. 1 to 4) and retract the fourth lens group, the guide rods and column screw shown in FIG. 1 should be included in the advance/retract mechanism. It is easy to include the guide rods and column screw in the advance/retract mechanism. Specifically, it is conceivable to mount the guide rods and column screw on the straight-ahead key ring shown in FIG. 1. This eliminates the need to stretch out at great length the guide rods and column screw, allowing the freed space to be used for the fourth lens group retracted from the photographic optical axis. This makes it possible to decrease the length of the collapsed lens barrel. Besides, the lens advance/retract mechanism makes it possible to increase the length of the extended lens barrel by advancing the fourth lens group accurately onto the optical axis during extension.

This makes it possible to implement a lens barrel whose collapsed length is decreased and whose extended length is increased.

Preferably, the fourth lens group acts as a focus lens.

Conventionally, the approach of retracting the focus lens from the photographic optical axis has been avoided because it can lead to misalignment of the photographic optical axis. However, the present invention reduces the length of the lens barrel using the advance/retract mechanism which not only retracts the fourth lens group from the photographic optical axis to the retracted position, but also advances the fourth lens group accurately onto the photographic optical axis.

Preferably, the lens advance/retract mechanism retracts the fourth lens group from the photographic optical axis during collapse and retracts the second lens group to a place which coincides with the retracted fourth lens group when viewed along the optical axis.

In this way, the fourth lens group and second lens group can constitute a photographic optical system or the first lens group and third lens group together with the second lens group and fourth lens group can constitute a twin-lens photographic optical system.

Also, preferably the lens barrel has an image pickup device which generates image signals by capturing light from a subject entering through the zoom lens held by the lens barrel.

When the lens barrel is equipped with an image pickup device in this way, it is possible to adjust focus using a travel mechanism of the lens barrel based on the image signals generated by the image pickup device. Also, the combined use of electronic and optical zooms makes it possible to further increase the magnification of the photographic apparatus.

Also, the present invention provides a second photographic apparatus which takes photographs by capturing light from a subject entering through a zoom lens held by a lens barrel and consisting of a first lens group, a second lens group, a third lens group, and a fourth lens group in this order when viewed from ahead along an optical axis, having:

a lens advance/retract mechanism which retracts at least the fourth lens group of the zoom lens from a photographic optical axis during collapse and advances the retracted lens group onto the photographic optical axis during extension.

By incorporating the lens barrel according to the present invention into a photographic apparatus in this way, it is possible to reduce the thickness of the photographic apparatus.

Preferably, the fourth lens group acts as a focus lens, the lens advance/retract mechanism retracts the fourth lens group from the photographic optical axis during collapse and retracts the second lens group to a place which coincides with the retracted fourth lens group when viewed along the optical axis, and the photographic apparatus has an image pickup device which generates image signals by capturing light from a subject entering through the zoom lens held by the lens barrel.

Also, a lens barrel according to the present invention may include an image taking lens consisting of a plurality of lens groups and which is capable of changing a barrel length thereof between a housed state of relatively short length and a photographing state of relatively long length, the lens barrel having:

a first lens group holding frame which holds a first lens group that is the foremost of the plurality of lens groups and a second lens group holding frame which holds a second lens group that is the second foremost of the plurality of lens groups, wherein:

the second lens group holding frame may be urged by urging means forward along an optical axis, and the first lens group holding frame may have a pushing section which pushes the second lens group holding frame along the optical axis during transition to the housed state and separates from the second lens group holding frame during the photographing state.

Further, this lens barrel may have: a fixed tube, a straight-ahead key member advanceably/retractably engaged with the fixed tube, a middle tube which rotatably engages with the straight-ahead key member and advances/retracts along with rotation due to cam engagement with the fixed tube, and a front tube which advanceably/retractably engages with the straight-ahead key member and advances/retracts along with rotation due to cam engagement with the middle tube, wherein the first lens group holding frame may be fixed to the front tube. In this case, the lens barrel may have a second lens group supporting frame which advances/retracts along with rotation of the middle tube due to cam engagement with the middle tube, wherein the second lens group holding frame may be supported by the second lens group supporting frame, being urged forward along an optical axis by the urging means.

Furthermore, this lens barrel may have: a second lens group retraction mechanism which retracts the second lens group from the optical axis of the image taking lens by turning the second lens group holding frame during transition to the housed state and advances the second lens group onto the optical axis during transition to the photographing state, wherein the pushing section may push the retracted second lens group holding frame during collapse.

A lens barrel according to the present invention may hold an image taking lens consisting of a first lens group, a second lens group, a third lens group, and a fourth lens group in this order when viewed from ahead along an optical axis and which is capable of changing a barrel length thereof between a housed state of relatively short length and a photographing state of relatively long length, having:

a lens advance/retract mechanism which retracts at least the fourth lens group from a photographic optical axis during transition to the housed state and advances the retracted lens group onto the photographic optical axis during transition to the photographing state.

In this lens barrel, the fourth lens group may act as a focus lens, the lens advance/retract mechanism may retract the fourth lens group from the photographic optical axis during transition to the housed state and retract the second lens group to a place which coincides with the retracted fourth lens group when viewed along the optical axis. Also, this lens barrel may have an image pickup device which generates image signals by capturing light from a subject entering through the image taking lens held by the lens barrel.

Further, a lens barrel according to the present invention may hold an image taking lens consisting of a first lens group, a second lens group, a third lens group, and a fourth lens group in this order when viewed from ahead along an optical axis and which is capable of changing a barrel length thereof between a housed state of relatively short length and a photographing state of relatively long length, having:

a lens advance/retract mechanism which retracts at least the third lens group lens from a photographic optical axis during transition to the housed state and advances the retracted lens group onto the photographic optical axis during transition to the photographing state.

In this lens barrel, the third lens group may act as a lens for zooming. Also, this lens barrel may have an image pickup device which generates image signals by capturing light from a subject entering through the image taking lens held by the lens barrel.

A photographic apparatus according to the present invention may take photographs by capturing light from a subject entering through an image taking lens held by a lens barrel and consisting of a first lens group, a second lens group, a third lens group, and a fourth lens group in this order when viewed from ahead along an optical axis, the lens barrel being capable of changing a barrel length thereof between a housed state of relatively short length and a photographing state of relatively long length, the photographic apparatus having:

a lens advance/retract mechanism which retracts at least the third lens group from a photographic optical axis during transition to the housed state and advances the retracted lens group onto the photographic optical axis during transition to the photographing state.

In this photographic apparatus, the fourth lens group may act as a focus lens and the third lens group may act as a lens for zooming. Also, this photographic apparatus may have an image pickup device which generates image signals by capturing light from a subject entering through the image taking lens held by the lens barrel.

Furthermore, a lens barrel according to the present invention may hold an image taking lens consisting of a first lens group, a second lens group, a third lens group, and a fourth lens group in this order when viewed from ahead along an optical axis and which is capable of changing a barrel length thereof between a housed state of relatively short length and a photographing state of relatively long length, having:

a lens advance/retract mechanism which retracts at least one of the lens groups from a photographic optical axis during transition to the housed state and advances the retracted lens group onto the photographic optical axis during transition to the photographing state.

In this case, the lens barrel may have an image pickup device which generates image signals by capturing light from a subject entering through the image taking lens held by the lens barrel.

Still furthermore, a photographic apparatus according to present invention may take photographs by capturing light from a subject entering through an image taking lens held by a lens barrel and consisting of a first lens group, a second lens group, a third lens group, and a fourth lens group in this order when viewed from ahead along an optical axis, the lens barrel being capable of changing a barrel length thereof between a housed state of relatively short length and a photographing state of relatively long length, the photographic apparatus having:

a lens advance/retract mechanism which retracts at least one of the lens groups from a photographic optical axis during transition to the housed state and advances the retracted lens group onto the photographic optical axis during transition to the photographing state. In this case, the photographic apparatus may have an image pickup device which generates image signals by capturing light from a subject entering through the image taking lens held by the lens barrel.

Also, an optical apparatus according to the present invention may hold a lens unit that includes a lens consisting of a first lens group, a second lens group, a third lens group, and a fourth lens group in this order when viewed from ahead along an optical axis, the lens unit being capable of changing a barrel length thereof between a first state of relatively short length and a second state of relatively long length, the optical apparatus having:

a lens advance/retract mechanism which retracts at least one of the lens groups from a photographic optical axis during transition to the first state and advances the retracted lens group onto the photographic optical axis during transition to the second state.

As described above, the present invention implements a lens barrel whose collapsed length can be further decreased, photographic apparatus which incorporates the lens barrel into its body, and an optical apparatus which has a lens whose length in a state of short length is further decreased.

BRIEF DESCRIPTION OF THE DRAWINGS

FIG. 22(l) is a diagram showing another lens arrangement of lens groups during collapse;

DETAILED DESCRIPTION OF THE INVENTION

Embodiments of the present invention are described below.

Figure 1:
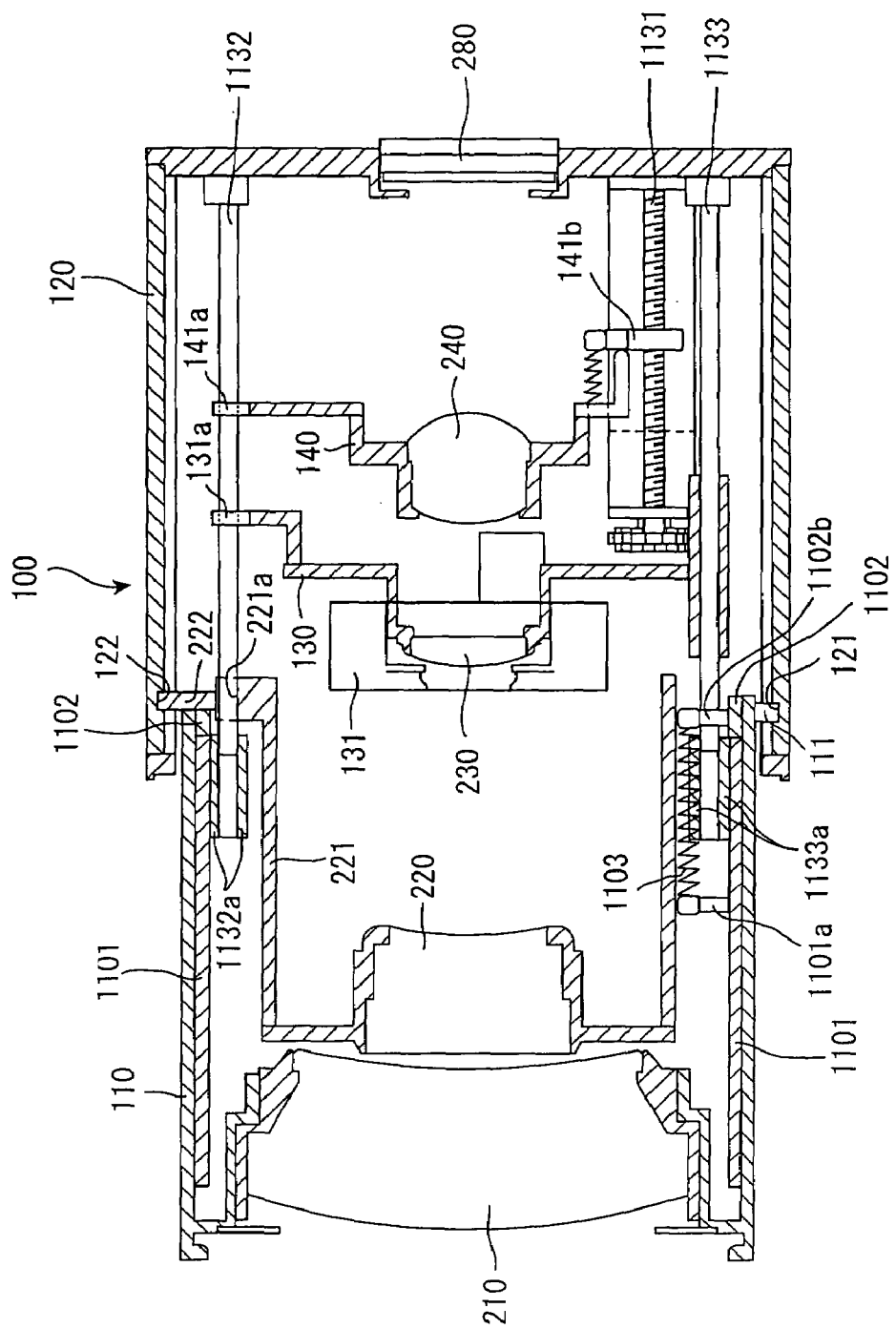
FIG. 1 is a sectional view taken along the optical axis of a lens barrel mounted in a conventional digital camera, where the lens barrel is at a wide-angle end.
Figure 2:
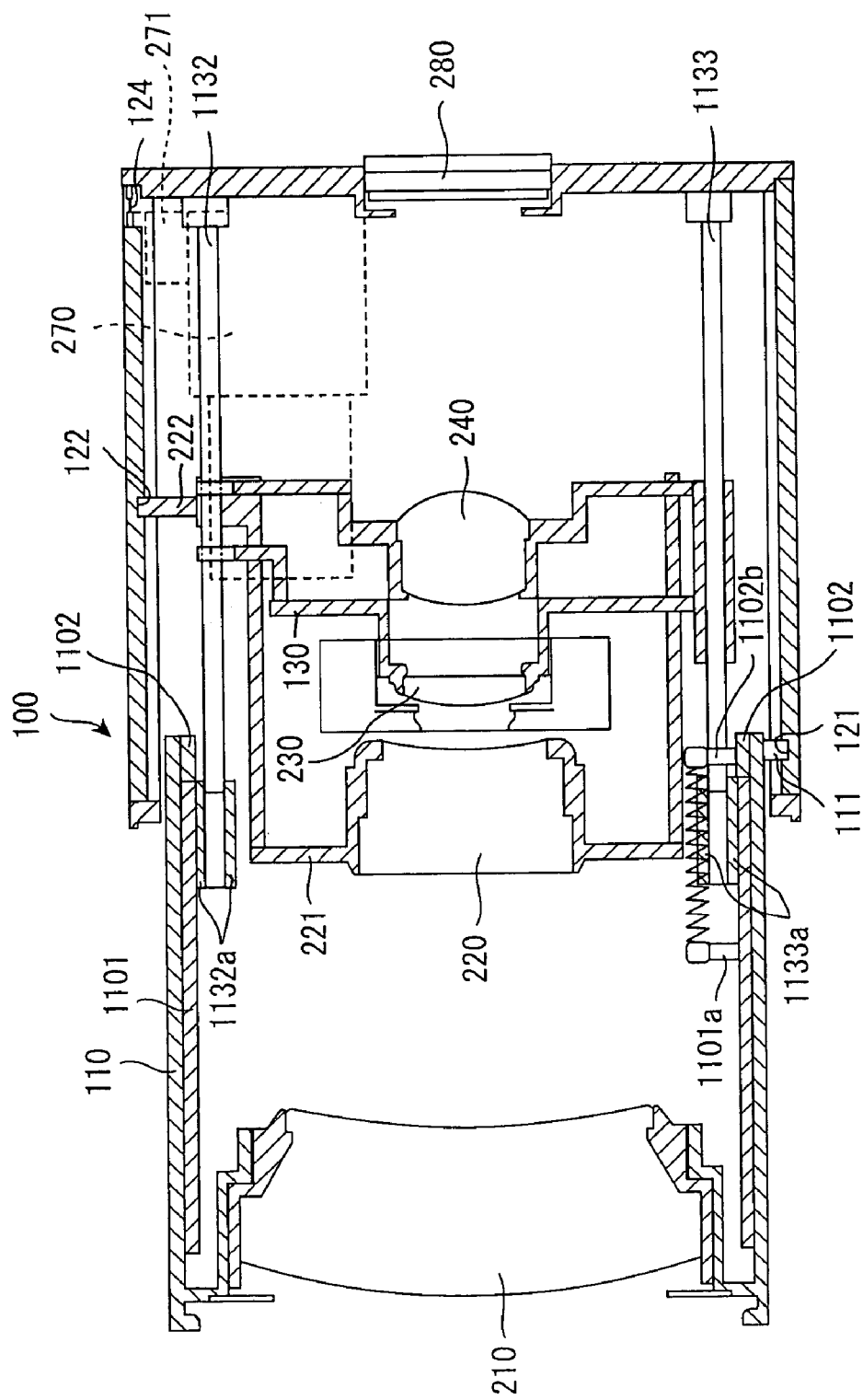
FIG. 2 is a sectional view taken along the optical axis of the lens barrel mounted in the conventional digital camera, where the lens barrel is at a telephoto end.
Figure 3:
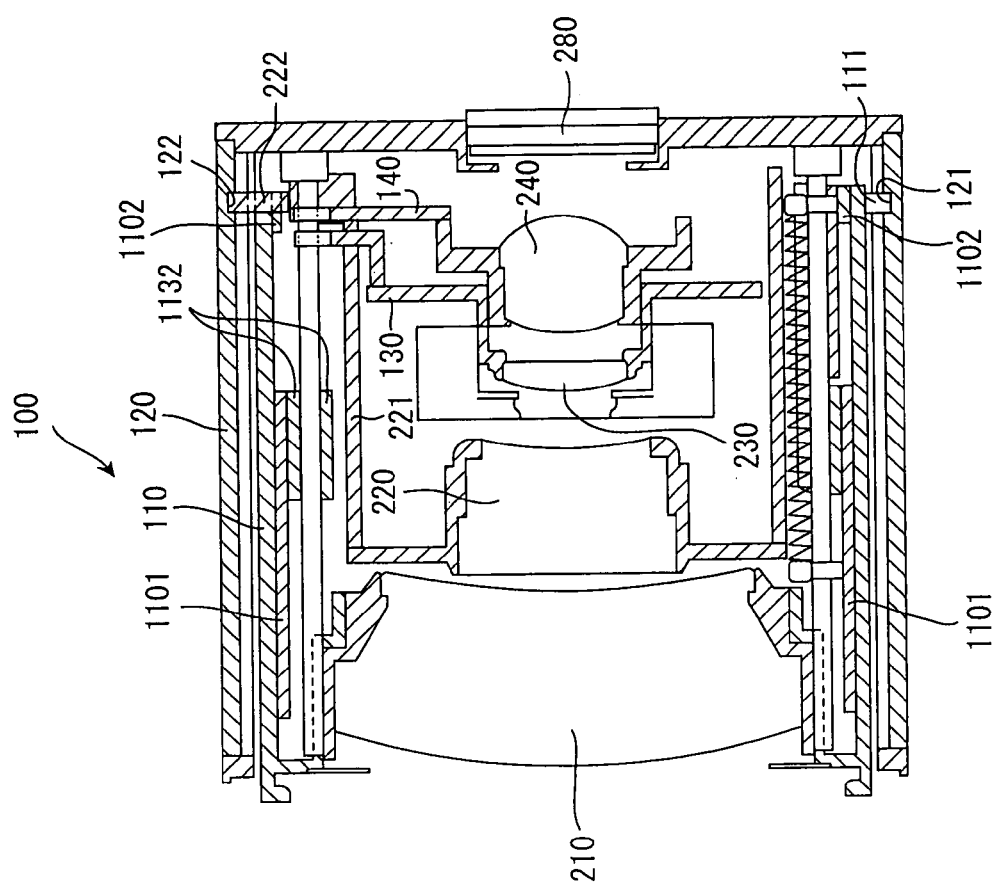
FIG. 3 is a sectional view taken along the optical axis of the lens barrel mounted in the conventional digital camera, where the lens barrel is collapsed.
Figure 4:
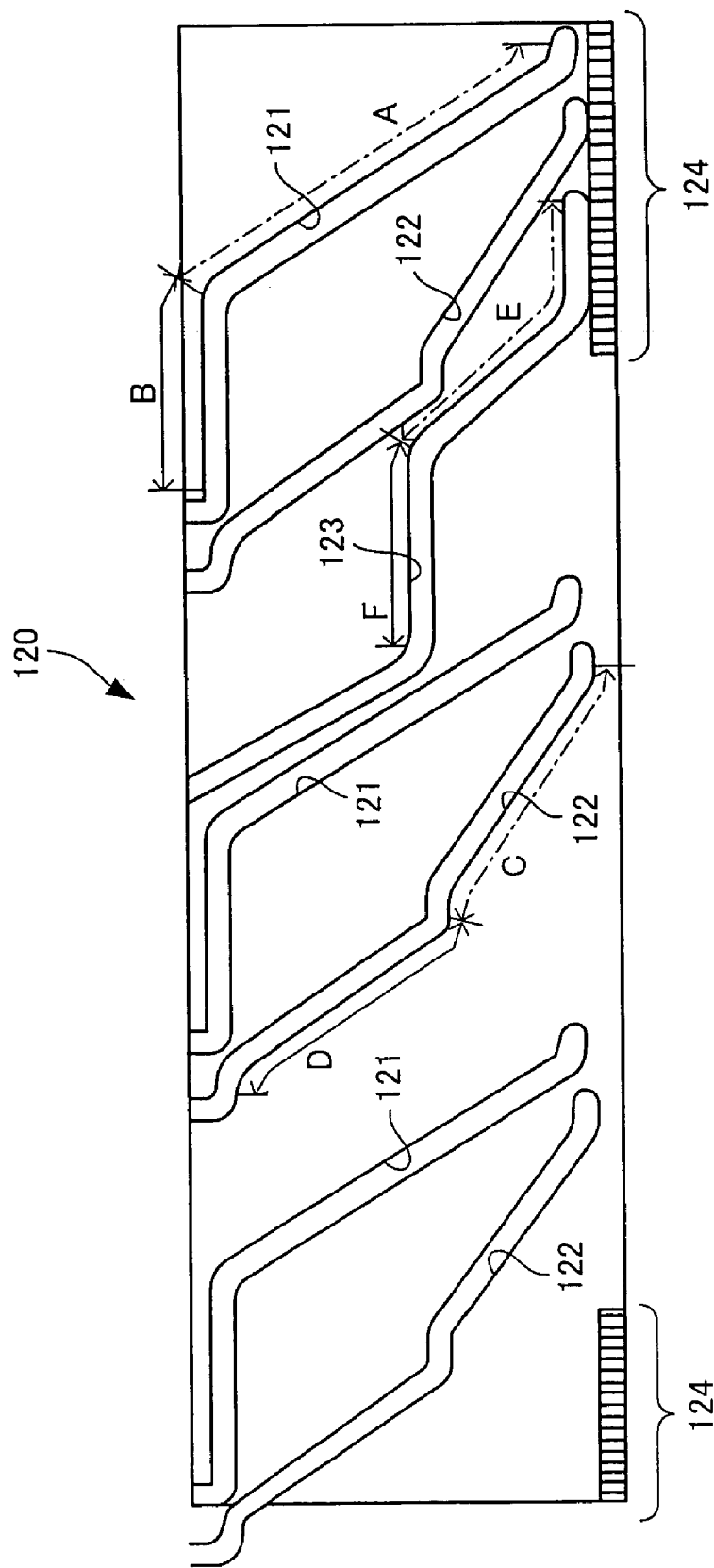
FIG. 4 is a developed view illustrating cam grooves formed in the inner wall of an outer tube 120 and used to extend an inner tube 110 as well as to adjust focus by adjusting distance between a second lens group 220 and third lens group 230.
Figure 5:
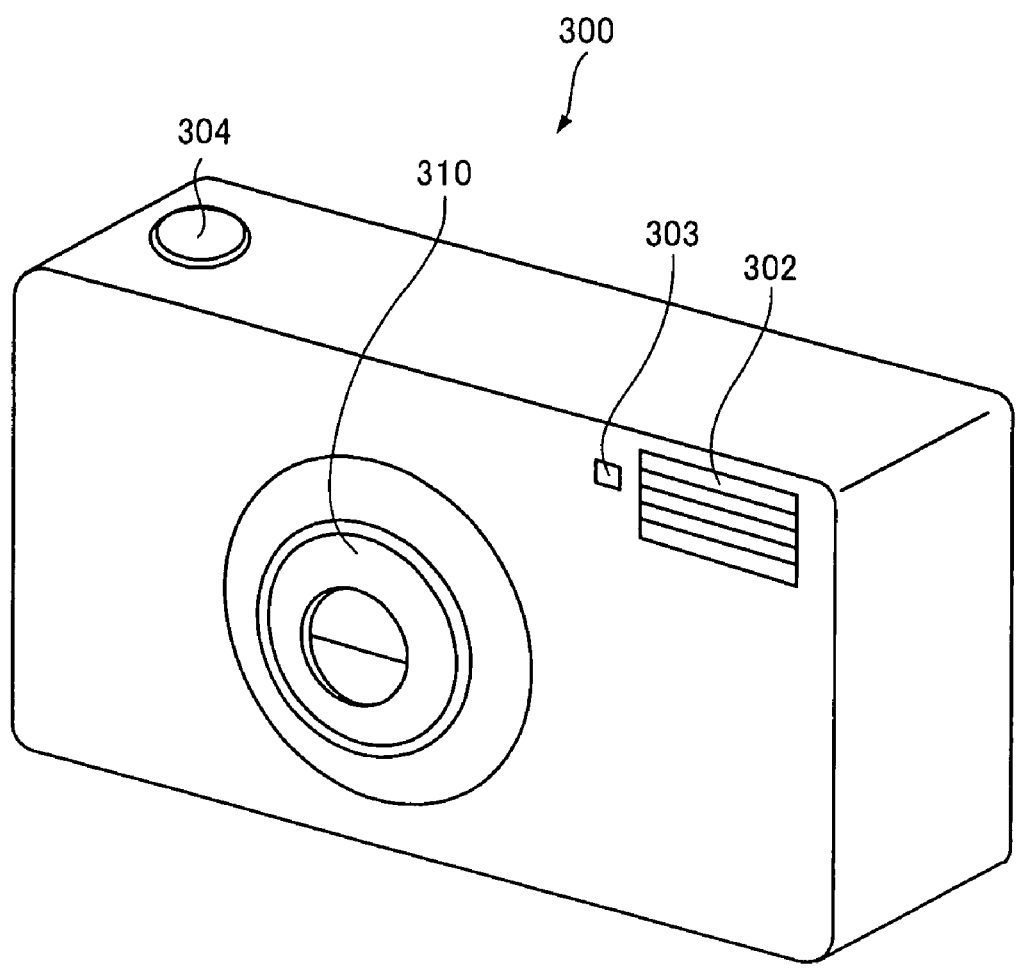
FIG. 5 is an external perspective view of a digital camera 300 which is an embodiment of a photographic apparatus according to the present invention and which incorporates an embodiment of a lens barrel according to the present invention into its body.
Figure 6:
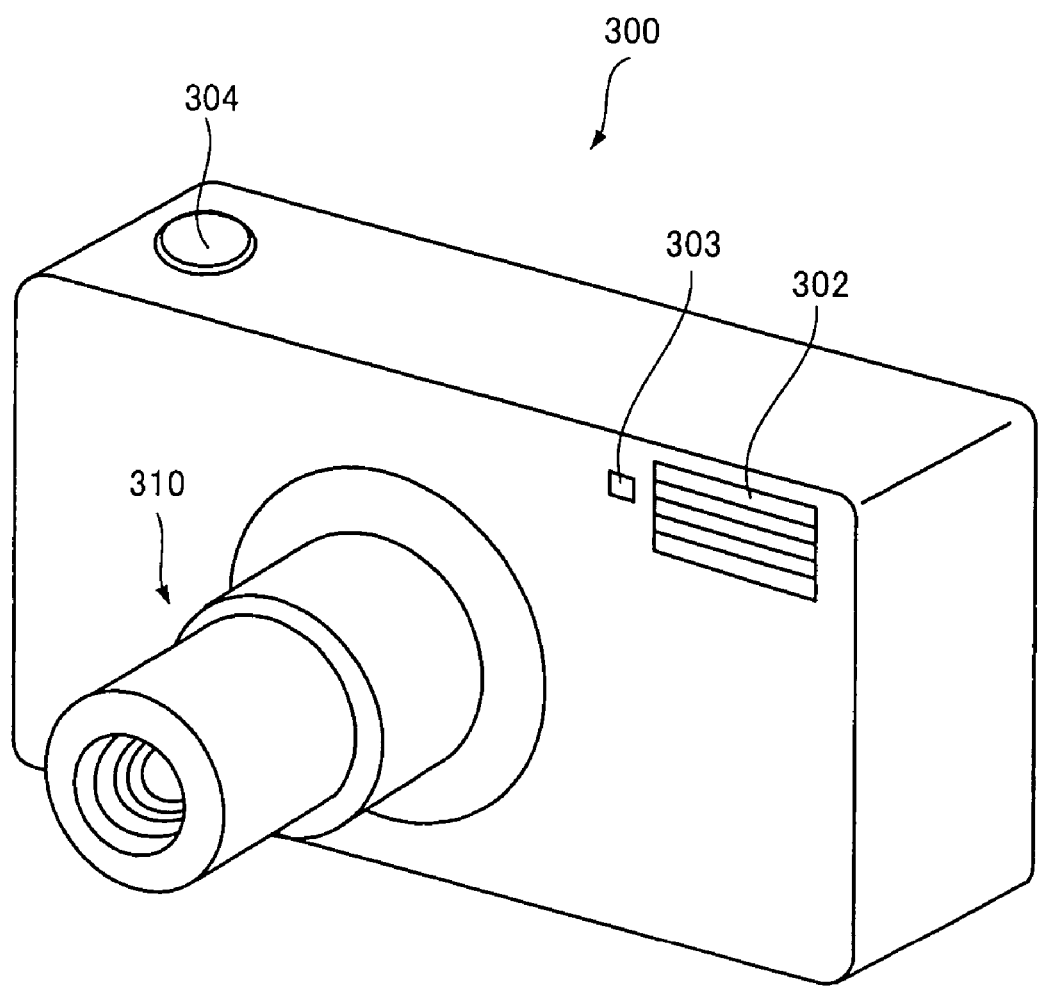
FIG. 6 is a diagram showing the digital camera in FIG. 5 with the lens barrel extended.

FIGS. 5 and 6 are external perspective views of a digital camera 300 which is an embodiment of a photographic apparatus according to the present invention and which incorporates an embodiment of a lens barrel according to the present invention into its body.

FIG. 5 is an external view in the case where a lens barrel 310 incorporated into the body of the digital camera 300 is in a collapsed state while FIG. 6 is an external view in the case where the lens barrel 310 is in an extended state.

The lens barrel 310 of the digital camera 300 shown in FIGS. 5 and 6 incorporates an image taking lens consisting of four lens groups. The second of the four lens groups is moved along the optical axis for adjustment of focal distance while the fourth lens group serving as a focus lens is moved along the optical axis for focus adjustment.

On the upper front part of the digital camera 300 shown FIGS. 5 and 6, there are a fill flash window 302 and finder objective window 303. On the top face, there is a shutter button 304.

A zoom control switch is mounted on the back (not shown) of the digital camera 300. While one end of the zoom control switch is depressed, the lens barrel 310 extends to the telephoto side. While the other end of the zoom control switch is depressed, the lens barrel 310 moves to the wide-angle side.

Figure 7:
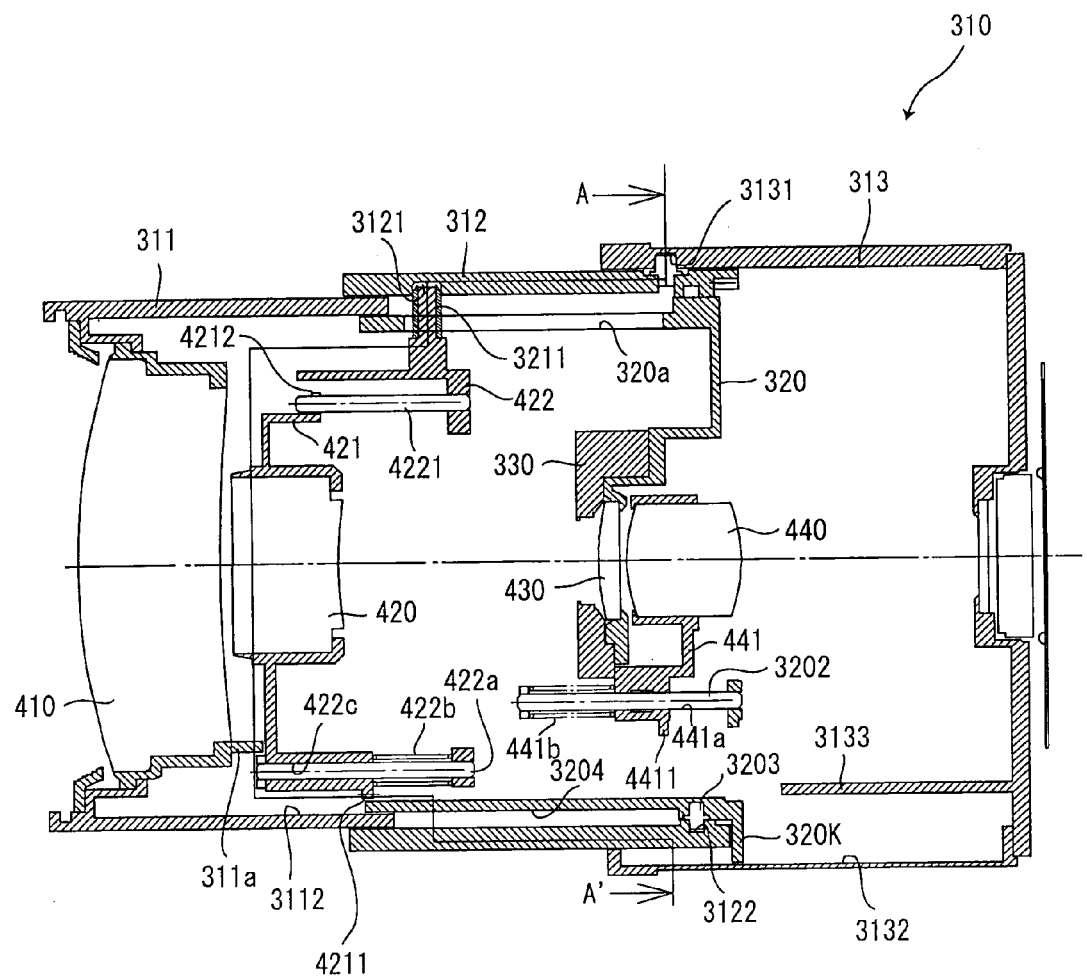
FIG. 7 is a sectional view along the optical axis of the lens barrel 310 incorporated into the digital camera in FIGS. 5 and 6 with the lens barrel at the wide-angle end.
Figure 8:
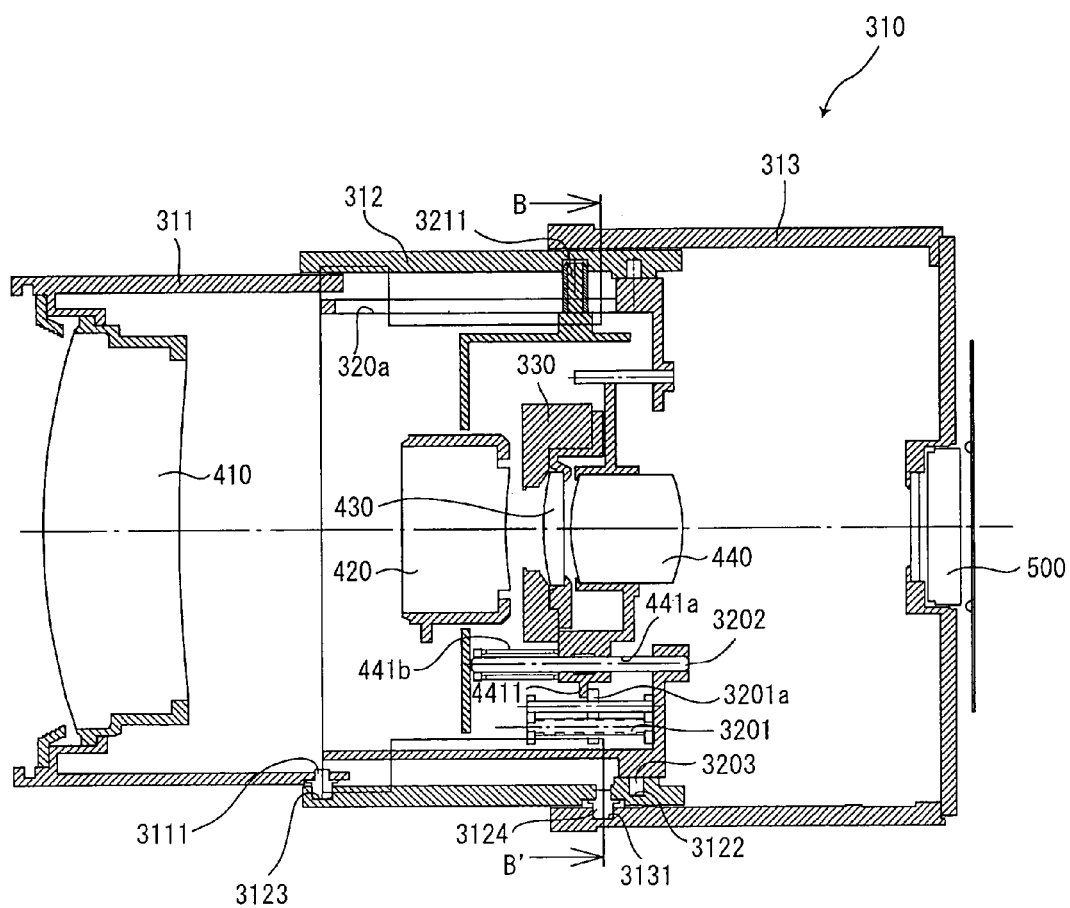
FIG. 8 is a sectional view along the optical axis of the lens barrel 310 incorporated into the digital camera in FIGS. 5 and 6 with the lens barrel at the telephoto end.
Figure 9:
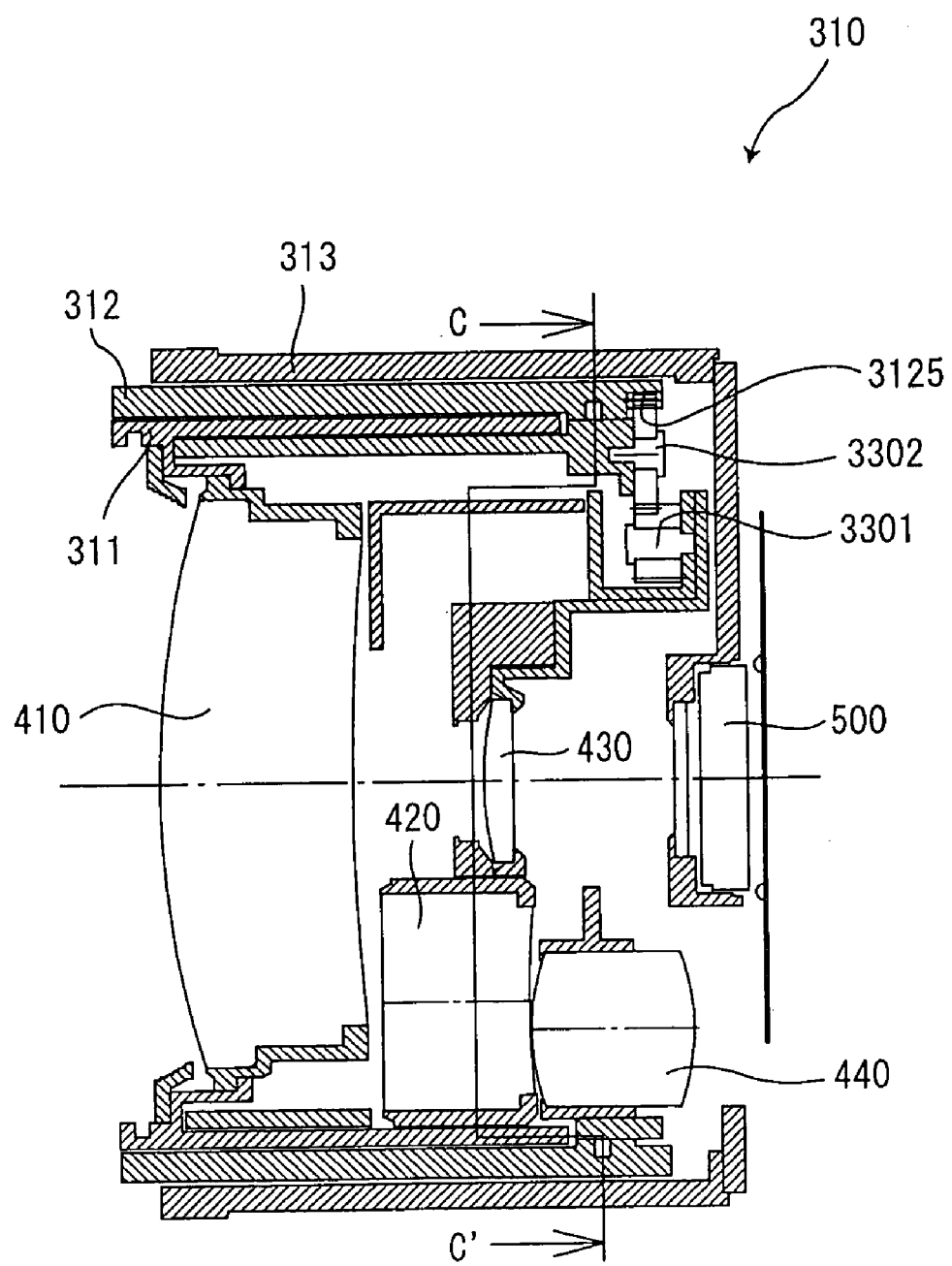
FIG. 9 is a sectional view along the optical axis of the lens barrel 310 incorporated into the digital camera in FIGS. 5 and 6 with the lens barrel collapsed.
Figure 10:
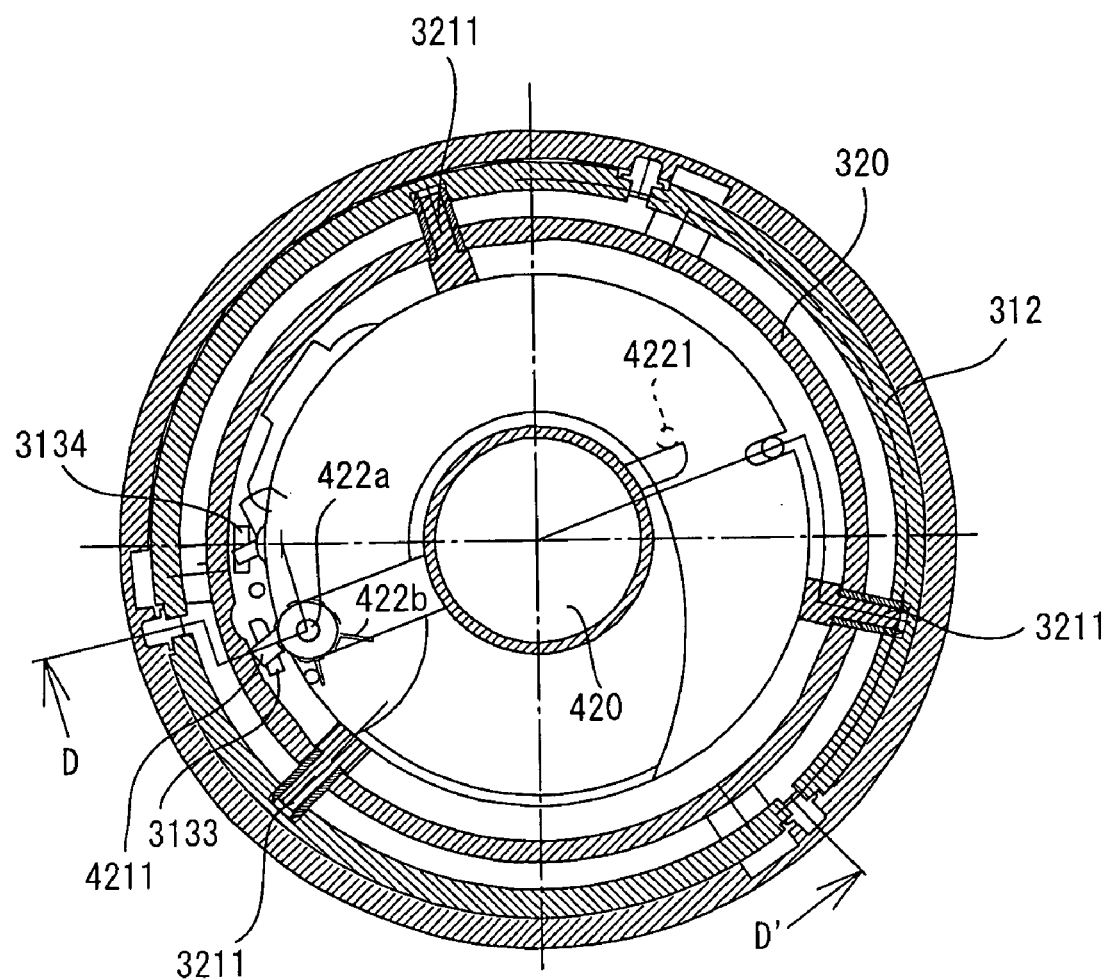
FIG. 10 is a sectional view of the lens barrel sliced along the line and viewed in the direction of the arrows in FIG. 7.
Figure 11:
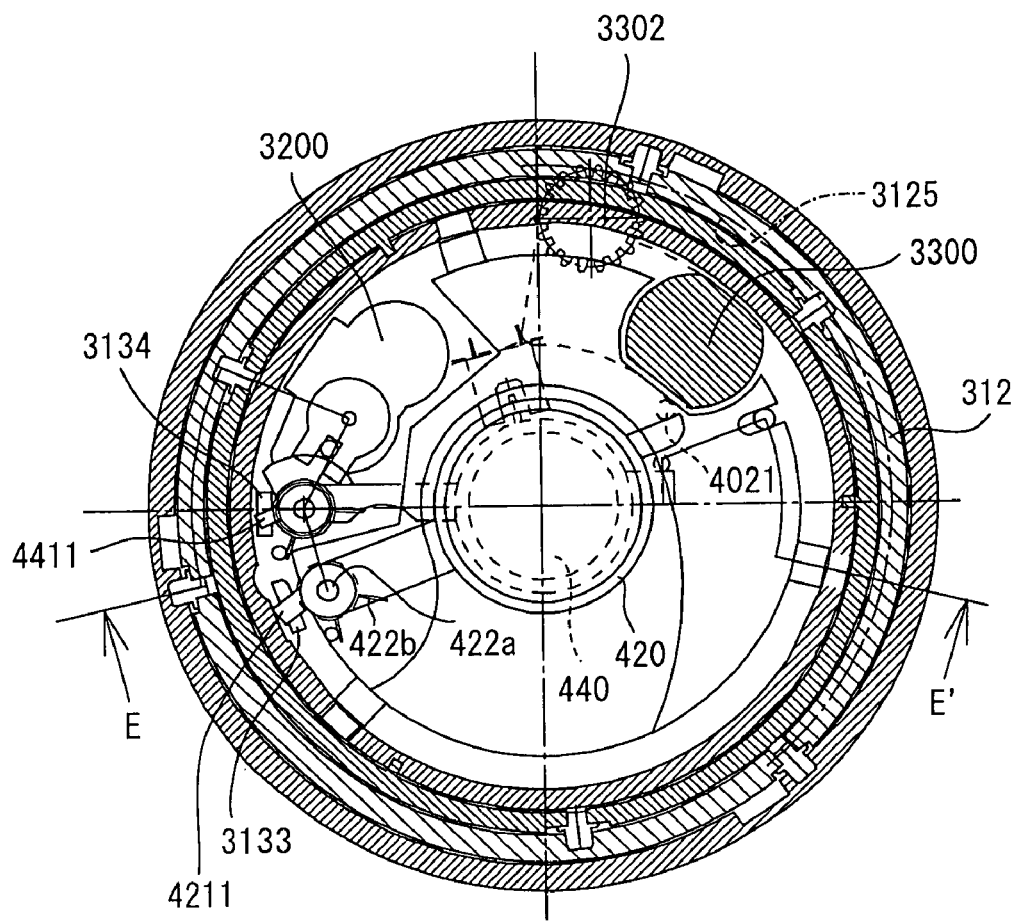
FIG. 11 is a sectional view of the lens barrel sliced along the line and viewed in the direction of the arrows in FIG. 8.
Figure 12:
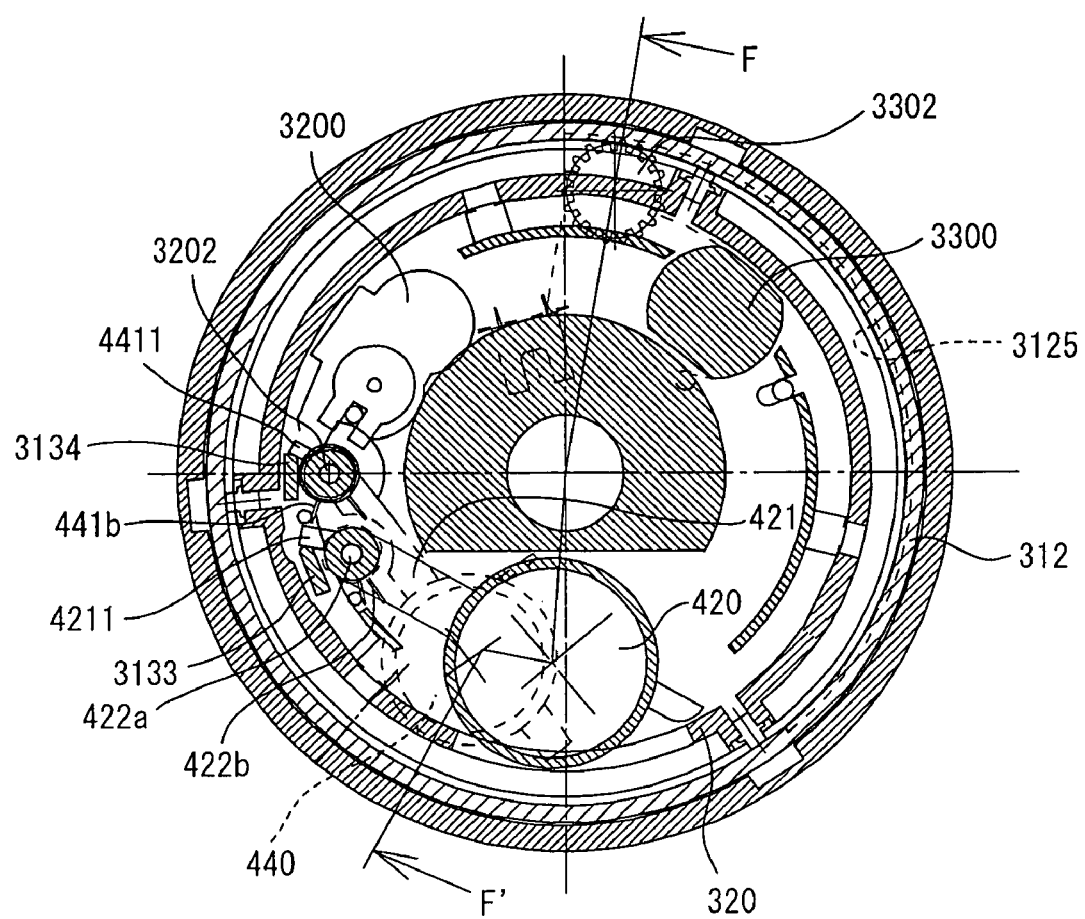
FIG. 12 is a sectional view of the lens barrel sliced along the line and viewed in the direction of the arrows in FIG. 9.
Figure 13:
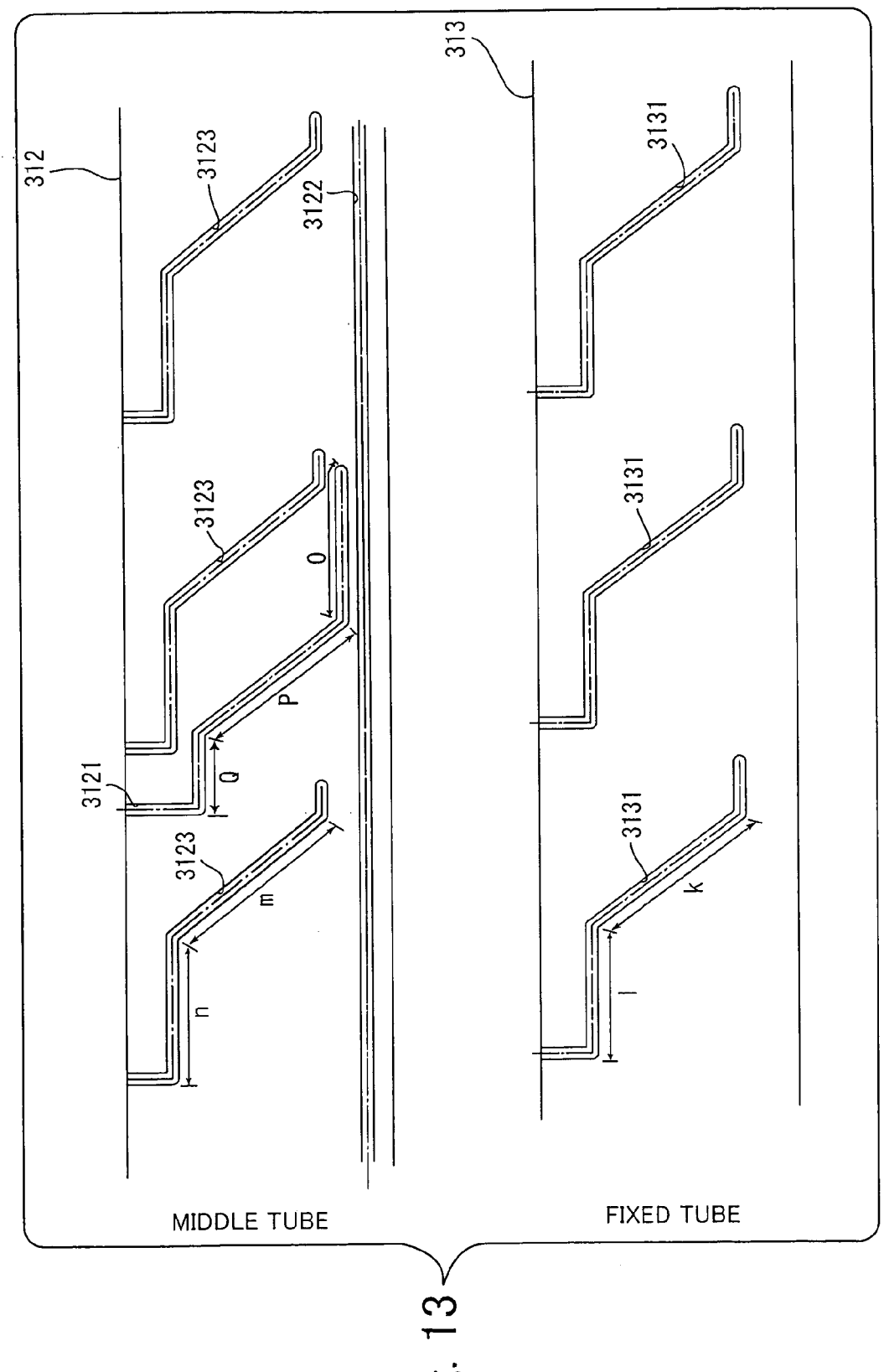
FIG. 13 is a developed view illustrating cam grooves formed in the inner wall of a middle tube.

FIGS. 7, 8, and 9 are sectional views taken along the optical axis of the lens barrel 310 incorporated into the digital camera in FIGS. 5 and 6. FIGS. 7, 8, and 9 show a wide-angle end, telephoto end, and collapsed state, respectively. FIG. 10 is a sectional view of the lens barrel in FIG. 7 sliced along line A–A' and viewed in the direction of the arrows in FIG. 7, FIG. 11 is a sectional view of the lens barrel in FIG. 8 sliced along line B–B' and viewed in the direction of the arrows in FIG. 8, FIG. 12 is a sectional view of the lens barrel in FIG. 9 sliced along line C–C' and viewed in the direction of the arrows in FIG. 9. FIG. 7 is a sectional view of the lens barrel sliced along line D–D' and viewed in the direction of the arrows in FIG. 10, FIG. 8 is a sectional view of the lens barrel sliced along line E–E' and viewed in the direction of the arrows in FIG. 11, FIG. 9 is a sectional view of the lens barrel sliced along line F–F' and viewed in the direction of the arrows in FIG. 12. FIG. 13 is a developed view illustrating cam grooves formed in the inner walls of the outermost and middle tubes of the three tubes which compose the lens barrel shown in FIGS. 7 to 12. Hereinafter, the outermost tube of the three tubes is referred to as a fixed tube 313, the middle tube of the three tubes is referred to as a middle tube 312, and the innermost tube is referred to as a front tube 311.

The lens barrel 310 incorporates a four-group zoom lens composed of a first lens group 410, second lens group 420, third lens group 430, and fourth lens group 440. The fourth lens group 440 at the tail of the four-group zoom lens is used as a focus lens.

As shown in FIGS. 7, 8, and 9, the first lens group 410 is held in the front tube 311. The front tube 311 is equipped with cam pins 3111 (see FIG. 8), which are engaged with cam grooves 3123 (see FIGS. 8 and 13) formed in the inner wall of the middle tube 312. The middle tube 312 is also equipped with cam pins 3124, which are engaged with cam grooves 3131 (see FIG. 13) formed in the inner wall of the fixed tube 313. A straight-ahead key ring 320 has a straight-ahead groove 3204 into which a protrusion 3112 of the front tube 311 is fitted. The fit (see FIG. 7) between the protrusion 3112 and straight-ahead groove 3204 serves to stop the rotation of the front tube 311. Thus, the front tube 311 and straight-ahead key ring 320 are only capable of relative travel along the optical axis, and do not rotate around the optical axis.

The middle tube 312 is configured to rotate by means of a zoom motor 3300 (see FIGS. 11 and 12). When the middle tube 312 rotates being driven by the zoom motor 3300, it moves along the optical axis following the shape (see FIG. 13) of the cam grooves 3131 in the inner surface of the fixed tube 313 and the front tube 311 moves along the optical axis following the shape of the cam grooves 3123 in cam engagement with the rotating and moving middle tube 312. FIGS. 11 and 12 show coupling between the zoom motor 3300 and middle tube 312, where the zoom motor 3300 torques a gear 3125 on the inner wall of the middle tube 312 via a coupling gear 3302 (see FIG. 9), causing the middle tube 312 to rotate.

A straight-ahead key 320K installed on the straight-ahead key ring 320 is advanceably/retractably engaged with a straight-ahead groove 3132 in the fixed tube 313. Furthermore, the middle tube 312 is rotatably engaged with the straight-ahead key ring 320 as cam pins 3203 installed on the straight-ahead key ring 320 are engaged with circumferentially extending cam grooves 3122 (see FIGS. 8 and 13) formed in the middle tube 312. Thus, as the middle tube 312 advances/retracts along with rotation due to cam engagement with the fixed tube 313, the straight-ahead key ring 320 also advances/retracts along with the middle tube 312.

In this way, the middle tube 312 is capable of relative travel around the optical axis and capable of traveling along the optical axis integrally with the straight-ahead key ring 320.

Of the lens group holding frames which hold the lens groups, relationship among a second lens group holding frame 421 which holds the second lens group 420, a fourth lens group holding frame 441 which holds the fourth lens group 440, and the middle tube 312, relationship between the straight-ahead key ring 320 and third lens group 430, and relationship between the middle tube 312 and fixed tube 313 are described with reference to FIGS. 7 to 13. In this embodiment, to further reduce the length of the lens barrel, the second and fourth lens groups are retracted to the retracted position. Such retraction mechanism is described as required in the process of describing relationships among lens groups.

The second lens group holding frame 421 which holds the second lens group 420 is supported movably by a lens group supporting frame 422 extending from the straight-ahead key ring 320 and whose outer wall has cam pins 3211. The cam pins 3211 penetrate a key way 320a of the straight-ahead key ring 320 and engages with cam grooves 3121 (see FIGS. 7 and 13) formed in the inner wall of the middle tube 312. Also, as shown in FIGS. 7 to 12, the straight-ahead key ring 320 supports the second lens group holding frame 421 via the second lens group supporting frame 422. It also supports the third lens group 430 directly. Furthermore, it supports the fourth lens group 440 via a travel mechanism constituted of a column screw 3201 (see FIG. 8).

As described above, the second lens group supporting frame 422 engaged with the straight-ahead key ring 320 has the cam pins 3211. As described above, the cam pins 3211 penetrate the key way 320a of the straight-ahead key ring 320 and engages with the cam grooves 3121 in the inner wall of the middle tube 312. As the cam pins 3211 move following the shape of the cam grooves 3121, the second lens group 420 moves from the telephoto end to the wide-angle end or from the wide-angle end to the telephoto end, being guided by the key way 320a.

The middle tube 312 has the cam pins 3124 implanted in its outer wall. The cam pins 3124 are engaged with the cam grooves 3131 formed in the fixed tube 313. The cam grooves 3131 run in such a way as to rotate through a predetermined angle (indicated by symbol k in FIG. 13) during extension from the collapsed state shown in FIG. 9 to the telephoto end shown in FIG. 8. Thus, the middle tube 312 extends along the optical axis following the cam grooves 3131 while rotating by the predetermined angle from the collapsed state (FIG. 9) to the telephoto end (FIG. 8) by receiving the driving force of the zoom motor 3300 (see FIGS. 11 and 12). Along with extension of the middle tube 312, the front tube 311 is extended without rotation, following the shape (indicated by symbol m in FIG. 13) of the cam grooves 3123. With the middle tube 312 extended, if the zoom switch is turned to the wide-angle position, the middle tube 312 rotates at the extended position (indicated by symbol 1 in FIG. 13), causing the second lens group 420 to move to the wide-angle end following the shape (indicated by symbol p in FIG. 13) of the cam grooves 3121. In this way, the lens barrel is zoomed according to operation of the zoom switch.

The second lens group holding frame 421 which holds the second lens group 420 is supported by the second lens group supporting frame 422, which in turn is supported by the straight-ahead key ring 320. The second lens group supporting frame 422 is equipped with a pivot shaft 422a in order for the second lens group holding frame 421 to rotate when retracting from the optical axis. On the other hand, the second lens group holding frame 421 has a through-hole 422c to accept the pivot shaft 422a. The pivot shaft 422a is passed through the through-hole 422c in the second lens group holding frame 421 and a spring 422b is wound around a base end of the pivot shaft 422a to urge the second lens group holding frame 421 forward along the optical axis. The spring 422b acts as a torsion spring which urges the second lens group holding frame 421 to turn around the pivot shaft 422a. When the lens barrel is collapsed, since the second lens group holding frame 421 is pushed by a pusher 311a on the front tube 311 due to the presence of the spring 422b, the second lens group 420 moves toward the base end and is housed compactly in the lens barrel (see FIG. 9). When the lens barrel is extended, since the pusher 311a (see FIG. 7) on the front tube which holds the first lens group 410 separates from the second lens group supporting frame 422, the second lens group 420 is urged forward along the optical axis by the spring 422b. At this time, the second lens group holding frame 421 is urged also in the direction of rotation by the spring 422b, the stub 4212 on the second lens group holding frame 421 abuts the stop bar 4221, and the second lens group is held at the abutting position so that the center of the second lens group 420 will align accurately with the optical axis.

The second lens group holding frame 421 is located on one side of the pivot shaft 422a while on the other side, there is an extension member 4211. The extension member 4211 engages with a switching protrusion 3133 when it collapses together with the straight-ahead key ring 320. The switching protrusion 3133 is sloped in the retreating direction of the straight-ahead key ring 320.

When the extension member 4211 moves along the slope of the switching protrusion 3133 during collapse, the second lens group holding frame 421 rotates around the pivot shaft 422a to a place where it abuts the straight-ahead key ring 320 (see FIG. 12).

According to this example, an advance/retract mechanism of the second lens group 420 is composed of a series of members including the second lens group holding frame 421, its extension member 4211, the stub 4212 of the holding frame 421 opposite to the extension member, a torsion spring 421b, the stop bar 4221 provided on the second lens group supporting frame 422 supported by the straight-ahead key ring 320, and the switching protrusion 3133 provided on the main body.

The third lens group 430 is supported directly by the straight-ahead key ring 320, which also supports the fourth lens group 440 via a travel mechanism consisting of a focus motor 3200 and a column screw 3201 meshing with a gear head of the focus motor 3200. The fourth lens group 440 is supported by the lens group holding frame 441. A through-hole 441a is made in the lens group holding frame 441 and a guide rod 3202 attached to the straight-ahead key ring 320 is passed through the through-hole 441a. The column screw 3201 is screwed into a nut 3201a, which is engaged with an extension member 4411 provided on the lens group holding frame 441. On the other hand, a spring 441b is wound around the guide rod 3202 which guides the lens group holding frame 441 accurately along the optical axis. The spring 441b urges the lens group holding frame. 441 toward the nut 3201a.

In this example, the fourth lens group holding frame 441 is equipped with an advance/retract mechanism as is the case with the second lens group holding frame 421. When the extension member 4411 of the fourth lens group holding frame 441 engages with another switching protrusion 3134 during collapse, the fourth lens group 440 retracts from the optical axis (see FIG. 12) as is the case with the second lens group 420. This makes it possible to line up the first lens group 410 and third lens group 430 as closely as possible and then place the second lens group 420 and fourth lens group 440 closely above or below the first lens group 410 and third lens group 430, further reducing the length of the lens barrel.

As described above, the focus motor 3200 which moves the fourth lens group 440 along the optical axis is also supported by the straight-ahead key ring 320. The rotational driving force of the focus motor 3200 supported by the straight-ahead key ring 320 is transmitted via a gear train to rotate the column screw 3201 shown in FIG. 8. The nut 3201a fitted rotatably over the column screw 3201 moves by the distance equivalent to the rotation of the column screw 3201, moving the lens group holding frame 441 engaged with the nut 3201a, and consequently adjusting the focus.

When taking a photograph, a control apparatus (not shown) gives a drive command for focus adjustment to the focus motor 3200 supported by the straight-ahead key ring, based on image data generated by an image pickup device 500.

After the focus adjustment, when a shutter button 304 is pressed, a shutter unit 330 supported by the straight-ahead key ring is operated and an electronic shutter is operated to take a photograph. Consequently, light from the subject passes through the first lens group 410, second lens group 420, third lens group 430, and fourth lens group (focus lens) 440 and forms an image on a light-receiving surface of the image pickup device 500, which generates an image signal which represents the subject image formed on the light-receiving surface. Incidentally, wiring cables for use to transmit commands to the focus motor and shutter unit are not shown in FIGS. 7 to 12.

In this way, the straight-ahead key ring 320 which moves along the optical axis supports the second lens group 420 and third lens group 430. Also, it supports the fourth lens group 440 via the column screw 3201. Furthermore, it supports the focus motor 3200 which rotates the column screw 3201. In this configuration, the fourth lens group is moved together with the straight-ahead key ring to near the focus position and the position of the fourth lens group is fine-adjusted for focus adjustment by turning the column screw.

This eliminates the need to provide a column screw and guide rods stretching out along the optical axis from the light-receiving surface of the image pickup device and move the fourth lens group at great length along the guide rods by turning the column screw. This creates a free space between the image pickup device 500 and fourth lens group 440 without obstruction. When the lens barrel is collapsed, the second lens group 420 and fourth lens group 440 retracted from the optical axis can be stuffed into this free space (FIG. 9) on a different plane from the other lens groups, reducing the length of the lens barrel greatly. Also, since the front tube 311 is equipped with the pusher 311a which pushes the second lens group holding frame 421 to the second lens group supporting frame 422, compressing the spring 422b during collapse, it is possible to bring the first lens group 410 and second lens group 420 unlimitedly close to each other as well as to extend the second lens group greatly along the optical axis during extension by urging it forward along the optical axis under the force of the spring.

Consequently, even though the digital camera 300 shown in FIGS. 5 and 6 has a slim body, the lens barrel 310 is housed in the camera body when it is collapsed and the digital camera 300 allows photography with a high zoom ratio when the lens barrel 310 holding the four-group zoom lens is extended from the camera body.

Finally, an internal configuration of the digital camera in FIGS. 5 and 6 is described.

Figure 14:
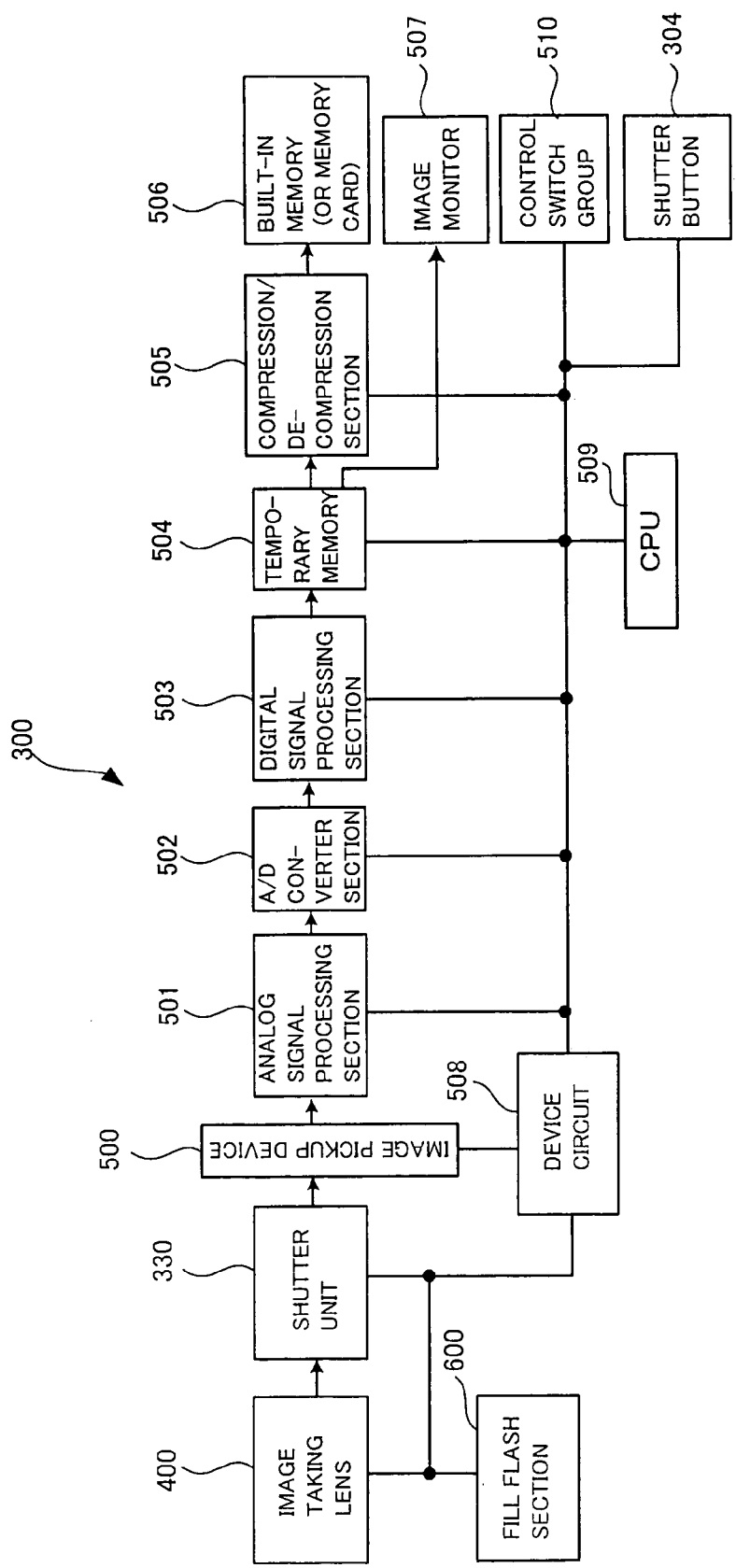
FIG. 14 is a block diagram showing a circuit configuration of the digital camera according to this embodiment.

FIG. 14 is a block diagram showing a circuit configuration of the digital camera according to this embodiment.

The digital camera 300 in this figure is equipped with a four-group zoom lens 400 composed of the first lens group 410, second lens group 420, third lens group 430, and fourth lens group 440 shown in FIGS. 7 to 9 as well as with the shutter unit 330 and image pickup device 500. A subject image formed on the image pickup device 500 via the zoom lens 400 and shutter unit 330 is converted into an analog image signal by the image pickup device 500. The shutter unit 330 is composed of an aperture which controls amounts of light falling on the image pickup device and a shutter which prevents smearing caused by light when the analog signal is read from the image pickup device 500.

The digital camera 300 is equipped with a fill flash section 600, which emits fill light ahead of the digital camera through the fill flash window 302 shown in FIGS. 5 and 6 in low-light conditions. The fill flash section 600 can be made to emit light other than in low-light conditions if necessary.

Also, the digital camera 300 is equipped with an analog signal processing section 501, A/D converter section 502, digital signal processing section 503, temporary memory 504, compression/decompression section 505, built-in memory (or memory card) 506, image monitor 507, and a drive circuit 508. The image pickup device 500 is driven based on timings generated by a timing generation circuit (not shown) in the drive circuit 508 and outputs an analog image signal. Also, the drive circuit 508 includes drive circuits which drive the image taking lens 400, shutter unit, fill flash section 600, etc. The analog image signal outputted from the image pickup device 500 is subjected to analog signal processing by the analog signal processing section 501, to A/D conversion by the A/D converter section 502, and to digital signal processing by the digital signal processing section 503. Image data which represents the image after the digital signal processing is stored temporarily in the temporary memory 504. The image data stored in the temporary memory 504 is compressed by the compression/decompression section 505 and recorded in the built-in memory (or memory card) 506. Depending on image mode, the image data may be stored in the built-in memory (or memory card) 506 directly by omitting the process of compression. The image data stored in the temporary memory 504 is read out to display the image of the subject on the image monitor 507.

Furthermore, the digital camera 300 is equipped with a CPU 509 which controls the entire digital camera 300, control switch group 510 including a zoom control switch, and shutter button 304. A photograph is taken, i.e., image data such as those described above is generated when the user sets desired photographic conditions including a desired angle of view by operating the control switch group 510 and presses the shutter button 304.

Although in the above embodiment, the fourth lens group 440 and second lens group 420 are retracted, it is also possible to retract only the fourth lens group 440.

FIGS. 15 to 20 are diagrams showing a configuration of another embodiment of a lens barrel equipped with an advance/retract mechanism which retracts the fourth lens group 440. In the following description, it is assumed that a lens barrel 310' shown in FIGS. 15 to 20 is incorporated in the camera shown in FIGS. 5 and 6. The configuration of the lens barrel 310' shown in FIGS. 15 to 20 is the same as the one shown in FIGS. 7 to 12 except that the switching protrusion 3133 which is a part of the advance/retract mechanism of the second lens group shown in FIG. 10 has been removed and that there are some changes to the shape of the second lens group holding frame 421a.

Figure 15:
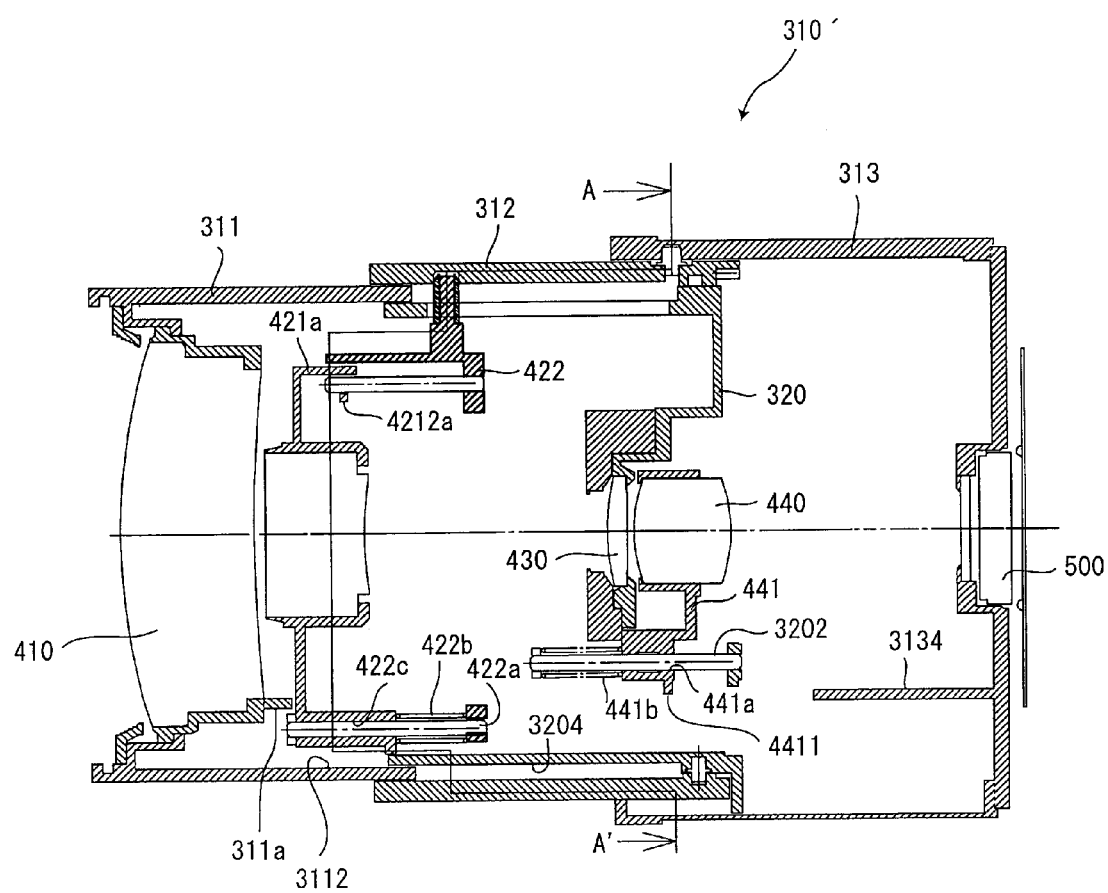
FIG. 15 is a sectional view along the optical axis of an embodiment of a lens barrel incorporated into the digital camera in FIGS. 5 and 6 with the lens barrel at the wide-angle end.
Figure 16:
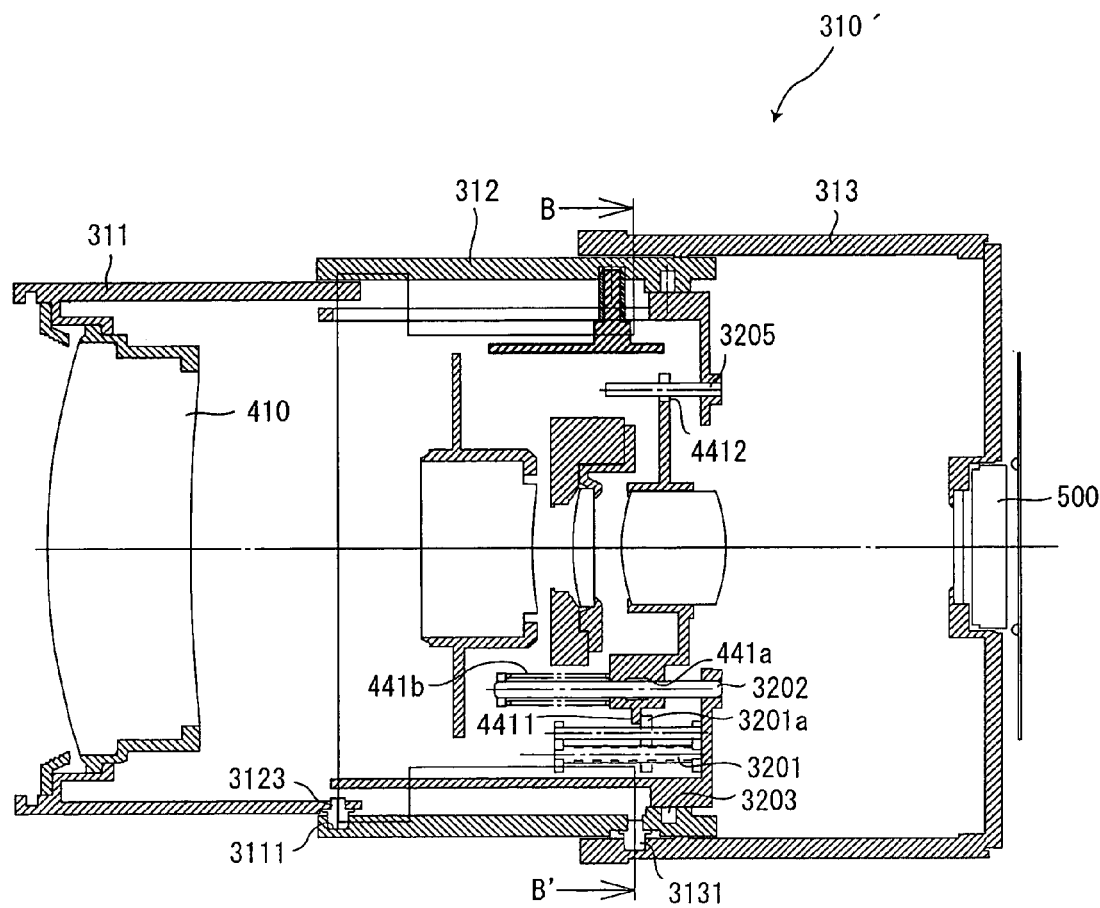
FIG. 16 is a sectional view along the optical axis of the lens barrel 310 incorporated into the digital camera in FIGS. 5 and 6 with the lens barrel at the telephoto end.
Figure 17:
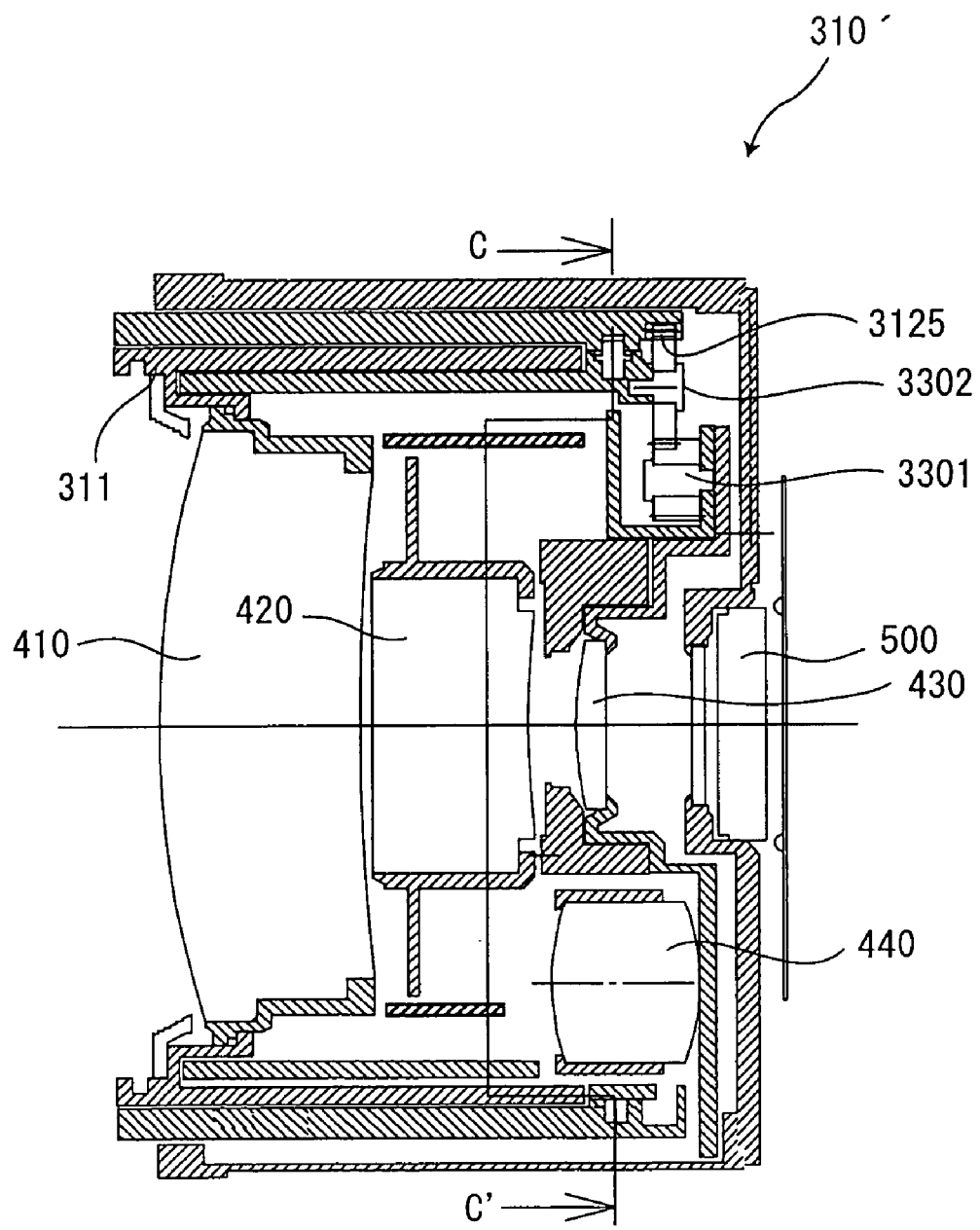
FIG. 17 is a sectional view along the optical axis of the lens barrel 310 incorporated into the digital camera in FIGS. 5 and 6 with the lens barrel collapsed.
Figure 18:
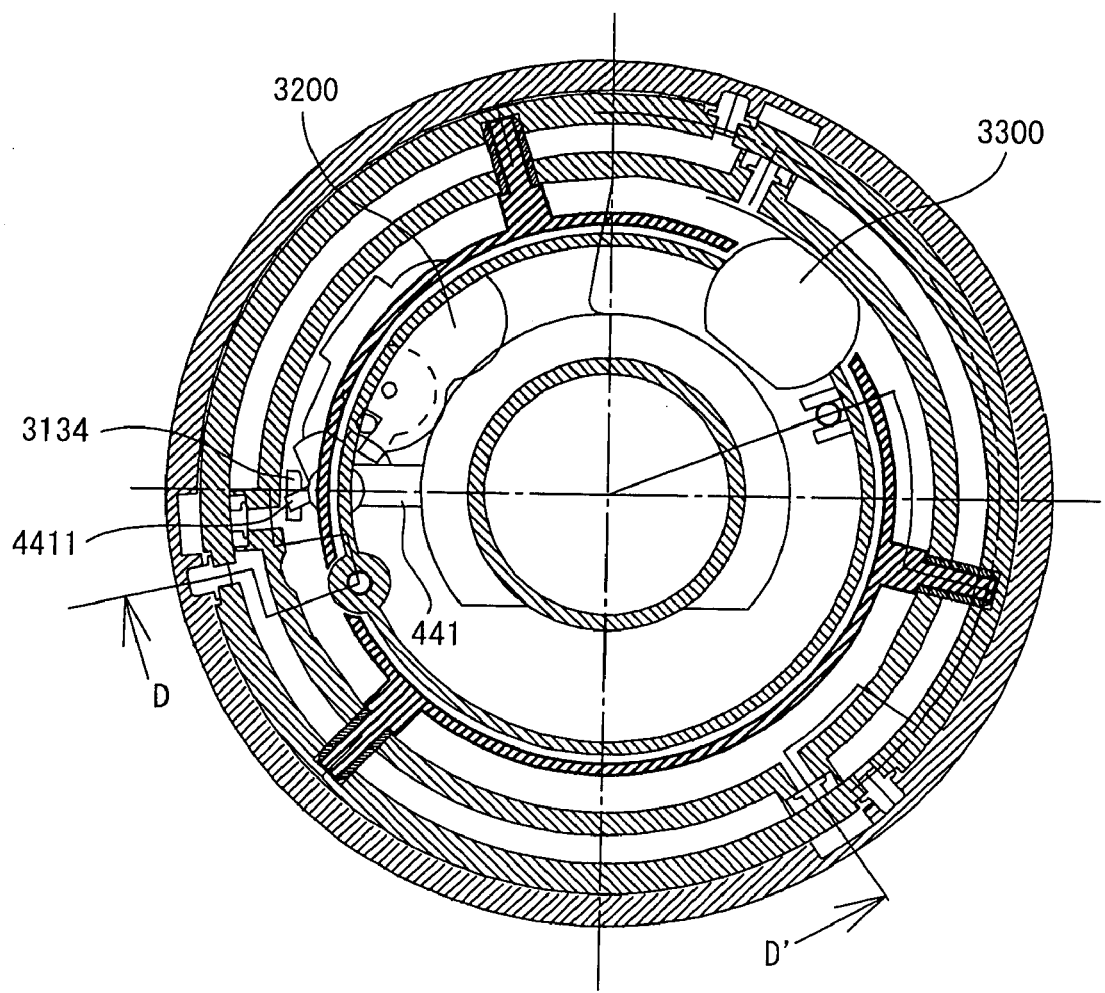
FIG. 18 is a sectional view of the lens barrel taken along the line and viewed in the direction of the arrows in FIG. 15.
Figure 19:
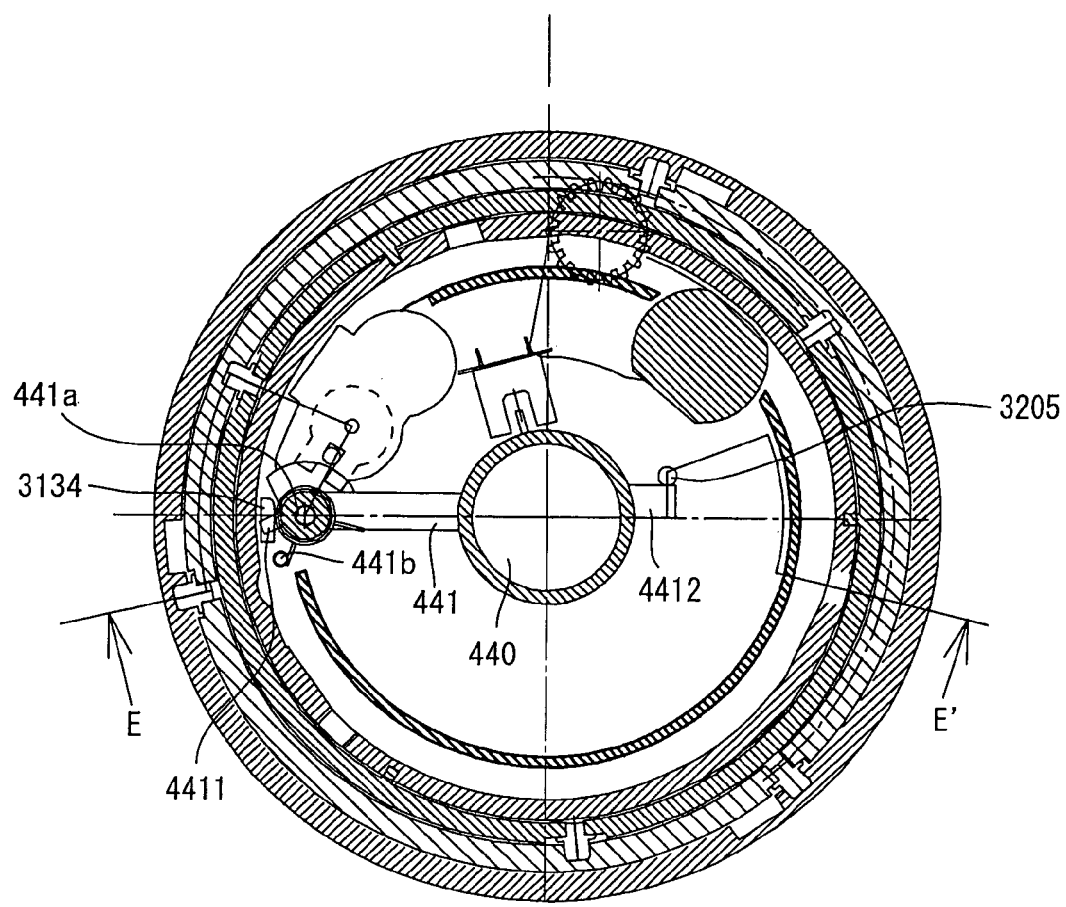
FIG. 19 is a sectional view of the lens barrel taken along the line and viewed in the direction of the arrows in FIG. 16.
Figure 20:
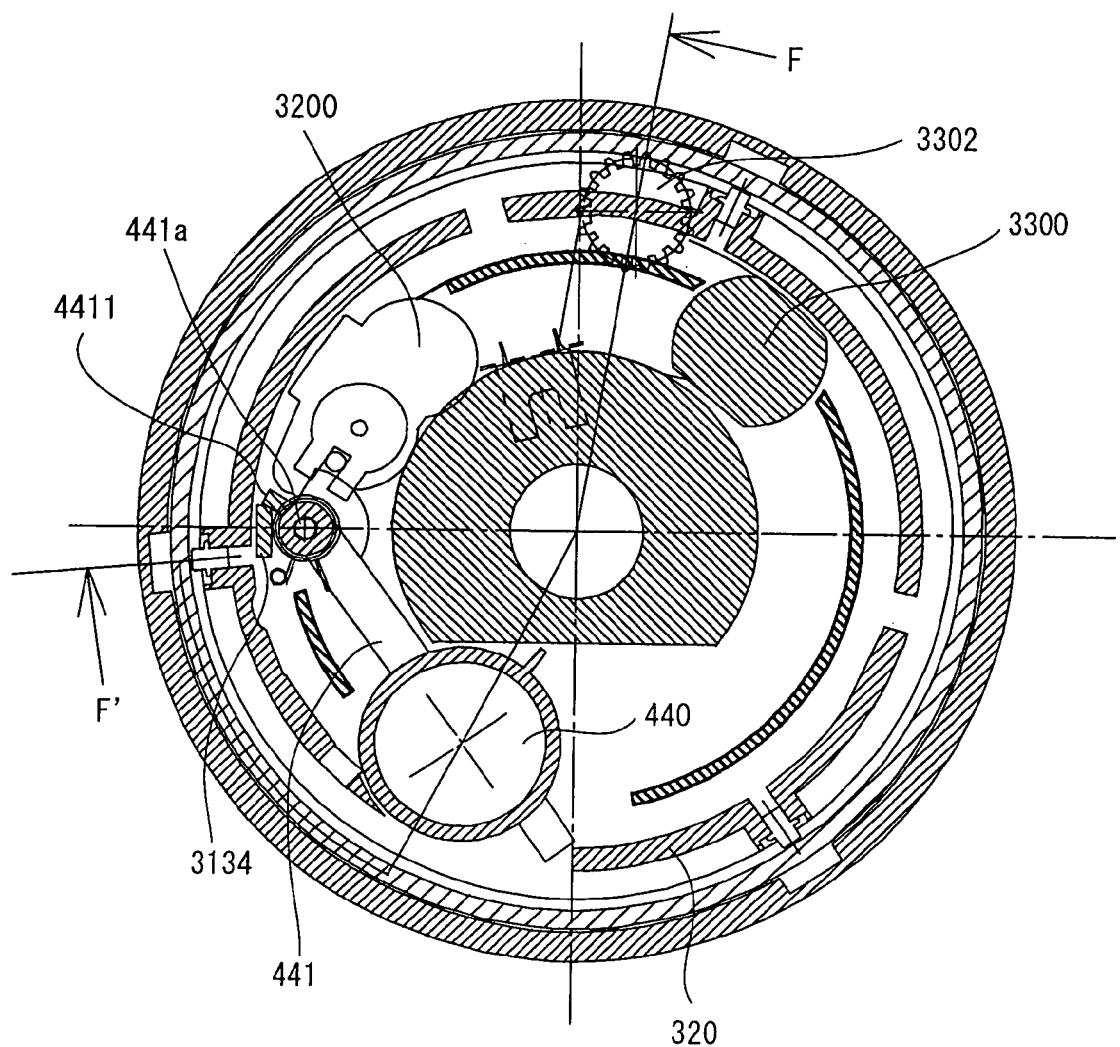
FIG. 20 is a sectional view of the lens barrel taken along the line and viewed in the direction of the arrows in FIG. 17.

FIGS. 15, 16, and 17 are sectional views taken along the optical axis of the lens barrel 310' incorporated into the digital camera shown in FIGS. 5 and 6. FIGS. 15, 16, and 17 show a wide-angle end, telephoto end, and collapsed state, respectively. FIG. 18 is a sectional view of the lens barrel in FIG. 15 sliced along line A–A' and viewed in the direction of the arrows in FIG. 15, FIG. 19 is a sectional view of the lens barrel in FIG. 16 sliced along line B–B' and viewed in the direction of the arrows in FIG. 16, and FIG. 20 is a sectional view of the lens barrel in FIG. 17 sliced along line C–C' and viewed in the direction of the arrows in FIG. 17. FIG. 15 is a sectional view taken along the arrows of line D–D' in FIG. 18, FIG. 16 is a sectional view taken along the arrows of line E–E' in FIG. 19, and FIG. 17 is a sectional view taken along the arrows of line F–F' in FIG. 20.

Since the fourth lens group 440 acts as a focus lens group, it is particularly important to align its optical axis. Although description is omitted in the embodiment shown in FIGS. 7 to 12, the fourth lens group holding frame 441 which holds the fourth lens group 440 has a mechanism which advances the fourth lens group 440 accurately to the photographic optical axis as is the case with the second lens group holding frame 421. The mechanism has the same configuration as the second lens group holding frame 421. It is configured such that an end 4412 of the fourth lens group holding frame 441 stops against a stop rod 3205 provided on the straight-ahead key ring 320 so that the center of the focus lens coincides accurately with the optical axis (see FIG. 16). As is the case with the embodiment shown in FIGS. 7 to 12, the advance/retract mechanism according to the present embodiment has a torsion spring 441b, switching protrusion 3134 (see FIG. 15), extension member 4411 of the fourth lens group holding frame 441, an end 4412 (see FIG. 16) of the fourth lens group holding frame 441, and stop rod 3205 (see FIG. 16) supported by the straight-ahead key ring 320. When the fourth lens group 440 collapses together with the straight-ahead key ring 320, as the extension member 4411 engages with the switching protrusion 3134 and moves along the slope of the switching protrusion 3134, the fourth lens group holding frame 441 rotates around the guide rod 3202 to a place (see FIG. 20) where it abuts the straight-ahead key ring 320. This makes it possible to line up the first lens group 410, second lens group 420, and third lens group 430 as closely as possible and then place the fourth lens group 440 closely above or below the first lens group 410, second lens group 420, and third lens group 430, further reducing the length of the lens barrel.

As described above, by installing the advance/retract mechanism which retracts at least the fourth lens group 440 from the photographic optical axis, it is possible to reduce the length of the lens barrel and by incorporating the shortened lens barrel into a photographic apparatus, it is possible to reduce the thickness of the photographic apparatus.

Although in this embodiment, the advance/retract mechanism retracts at least the fourth lens group 440 which acts as a focus lens from the photographic optical axis, there can be any number of configurations in which a lens group is retracted from the photographic optical axis. Last, a brief description will be given of possible lens arrangements which result when lens groups are retracted.

Figure 21:
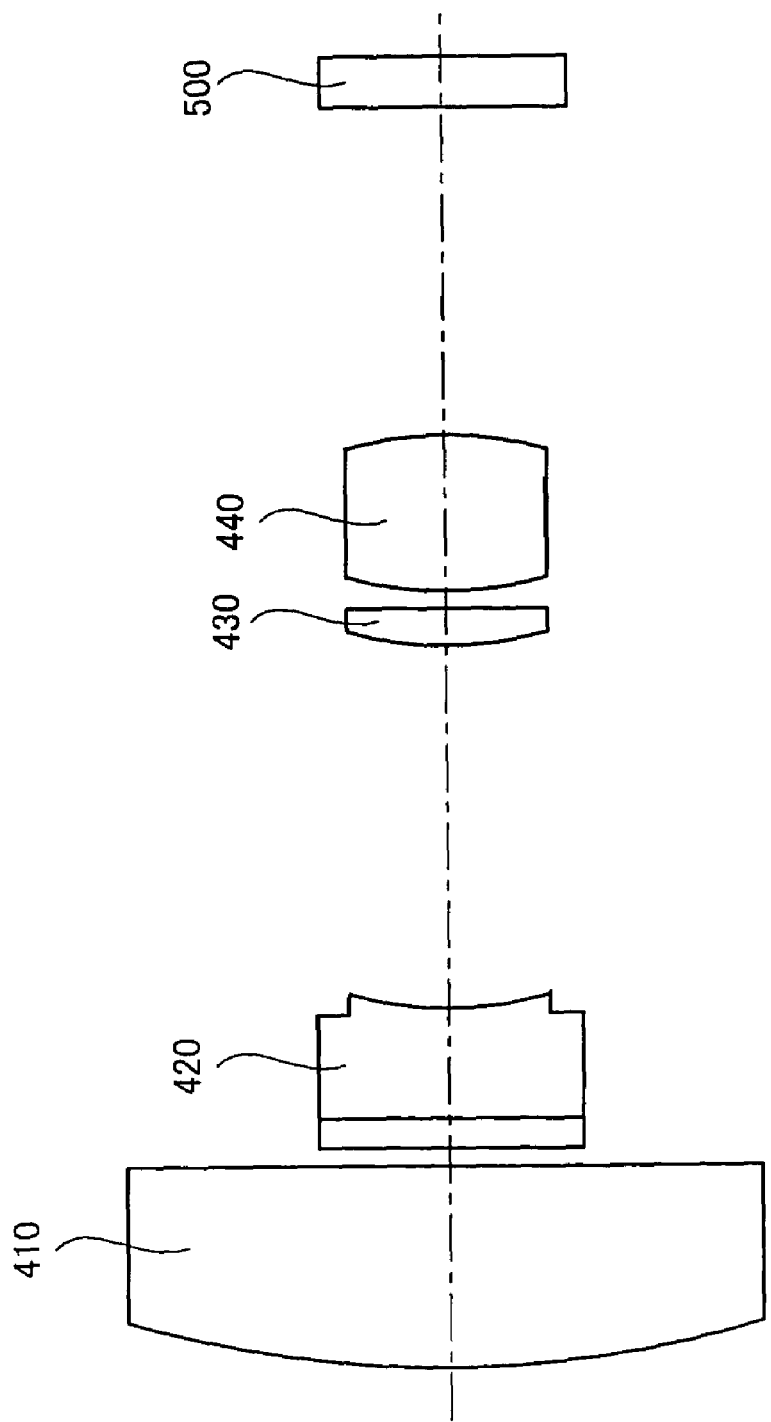
FIG. 21 is a diagram showing a lens arrangement of an image taking lens consisting of four groups during extension.
Figure 22A:
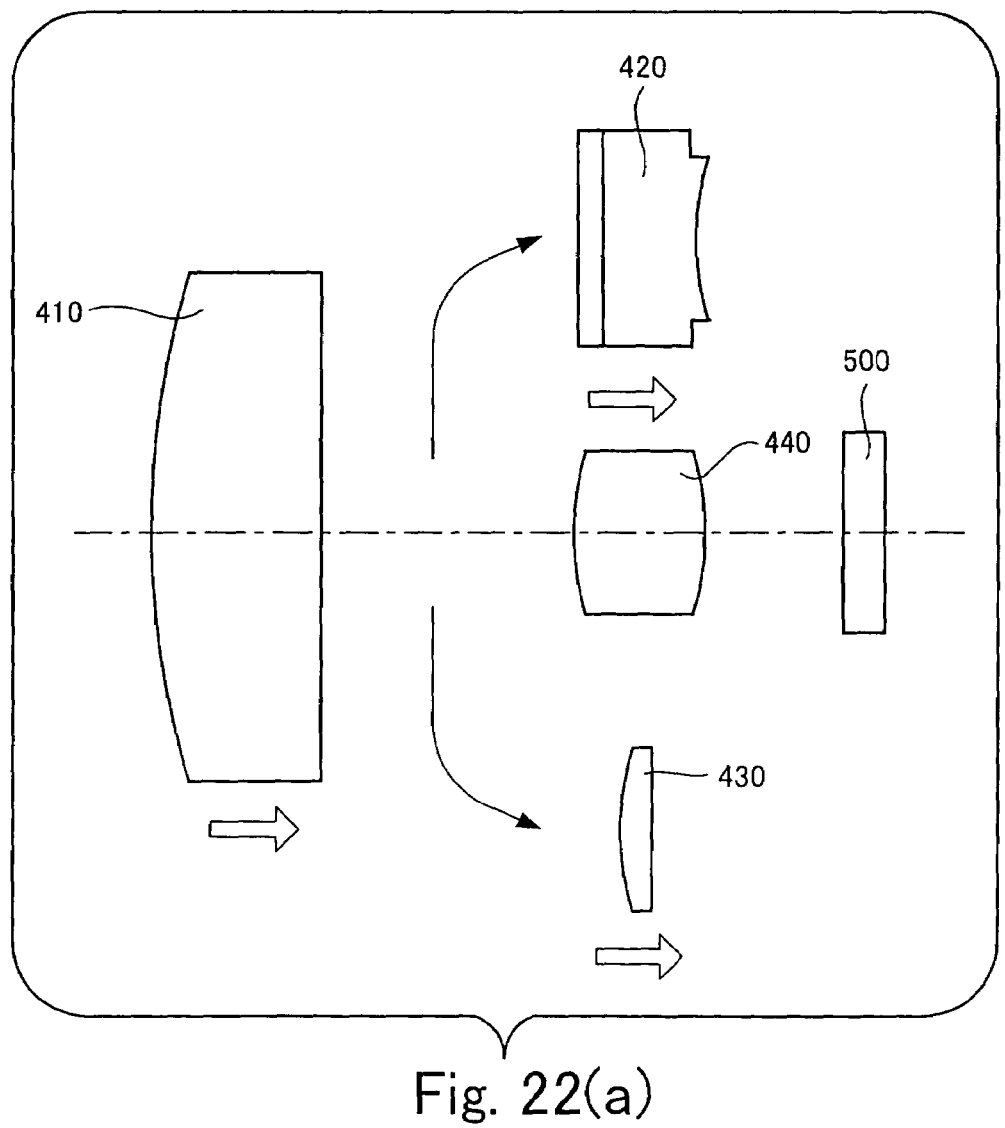
FIG. 22(a) is a diagram showing a lens arrangement of lens groups during collapse.
Figure 22B:
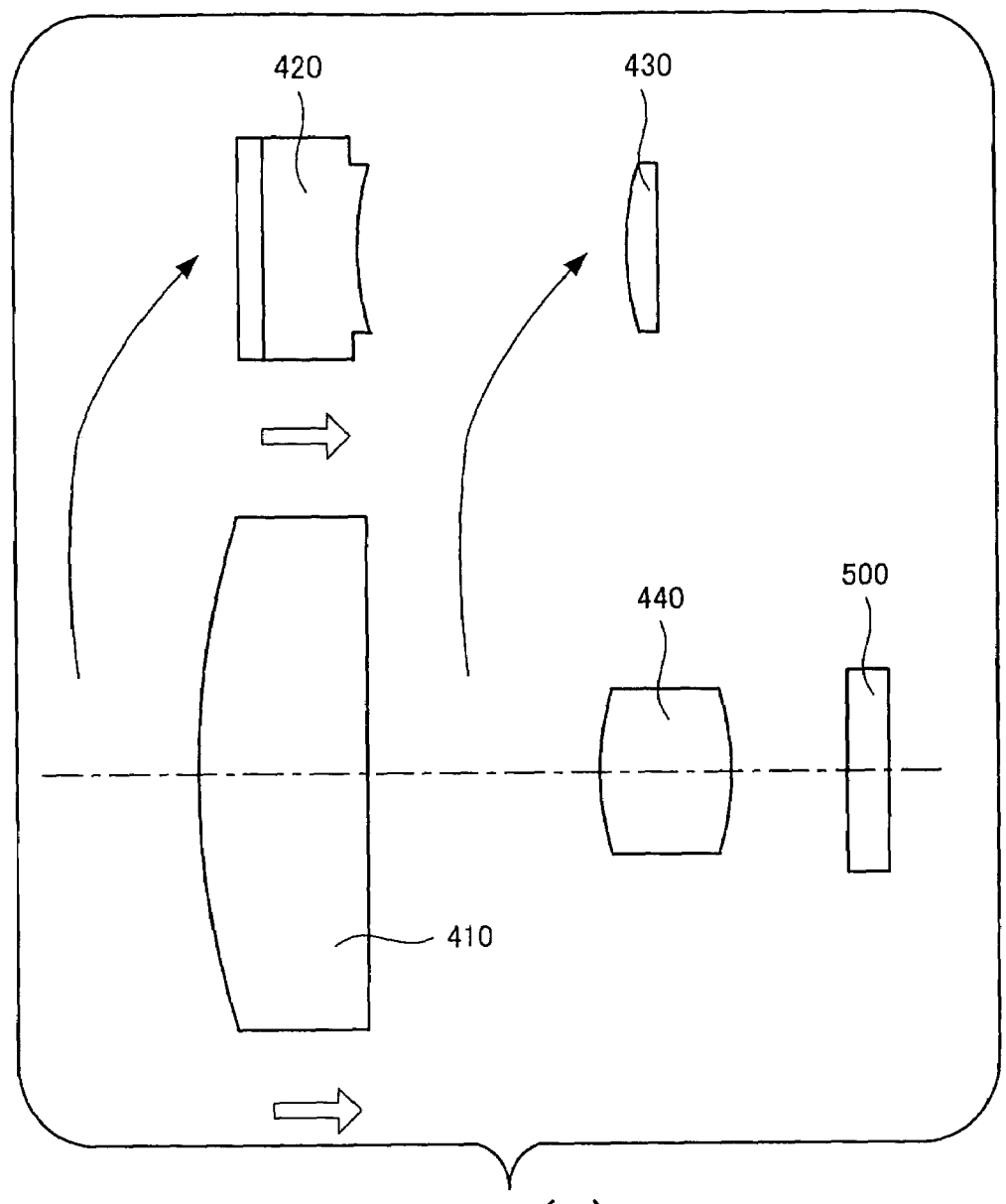
FIG. 22(b) is a diagram showing another lens arrangement of lens groups during collapse.
Figure 22C:
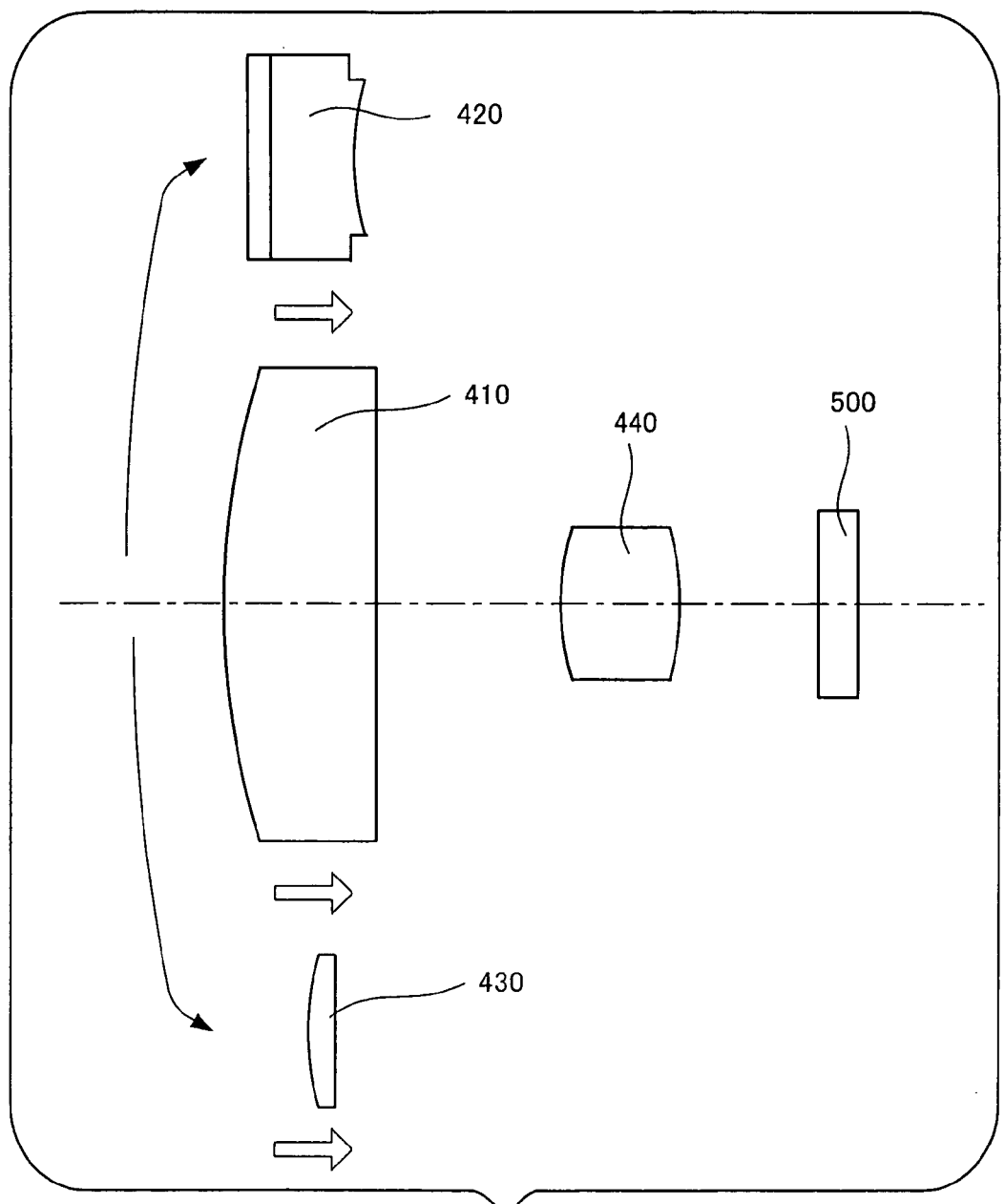
FIG. 22(c) is a diagram showing another lens arrangement of lens groups during collapse.
Figure 22D:
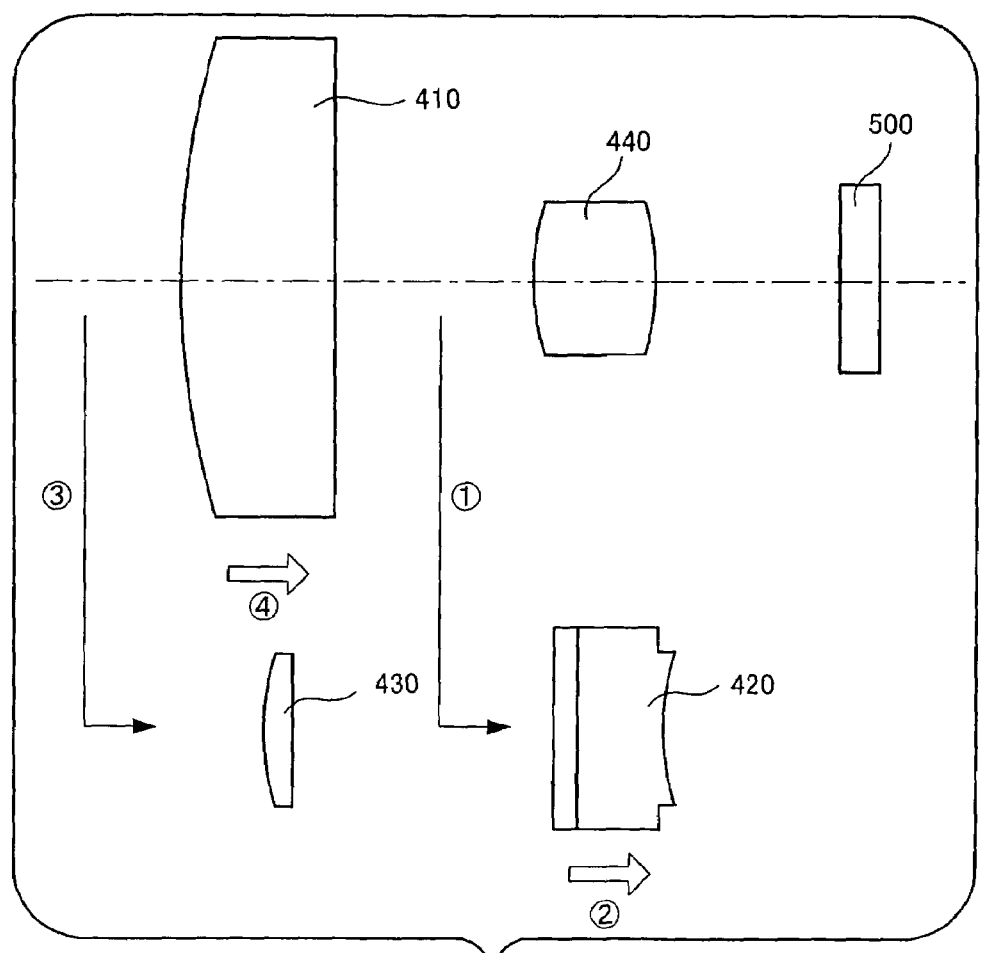
FIG. 22(d) is a diagram showing another lens arrangement of lens groups during collapse.
Figure 22E:
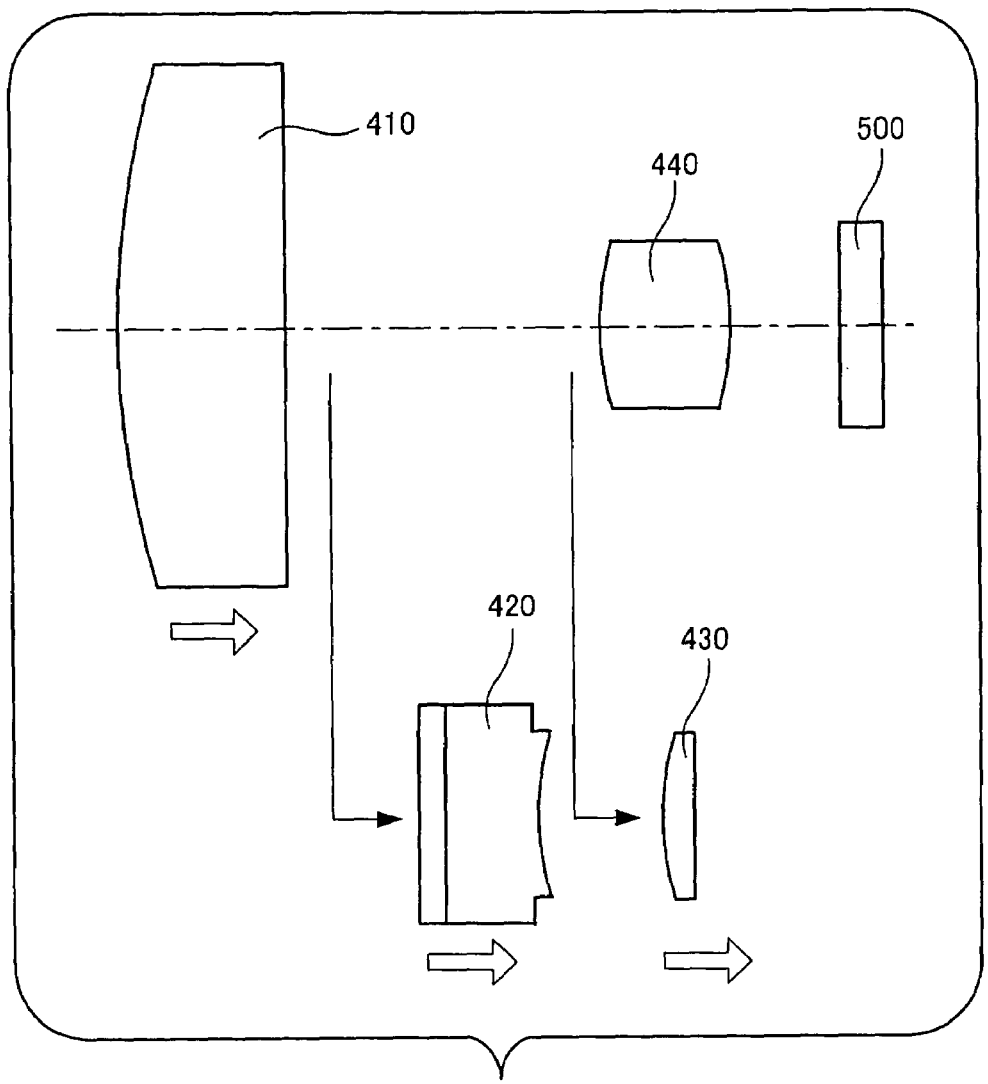
FIG. 22(e) is a diagram showing another lens arrangement of lens groups during collapse.
Figure 22F:
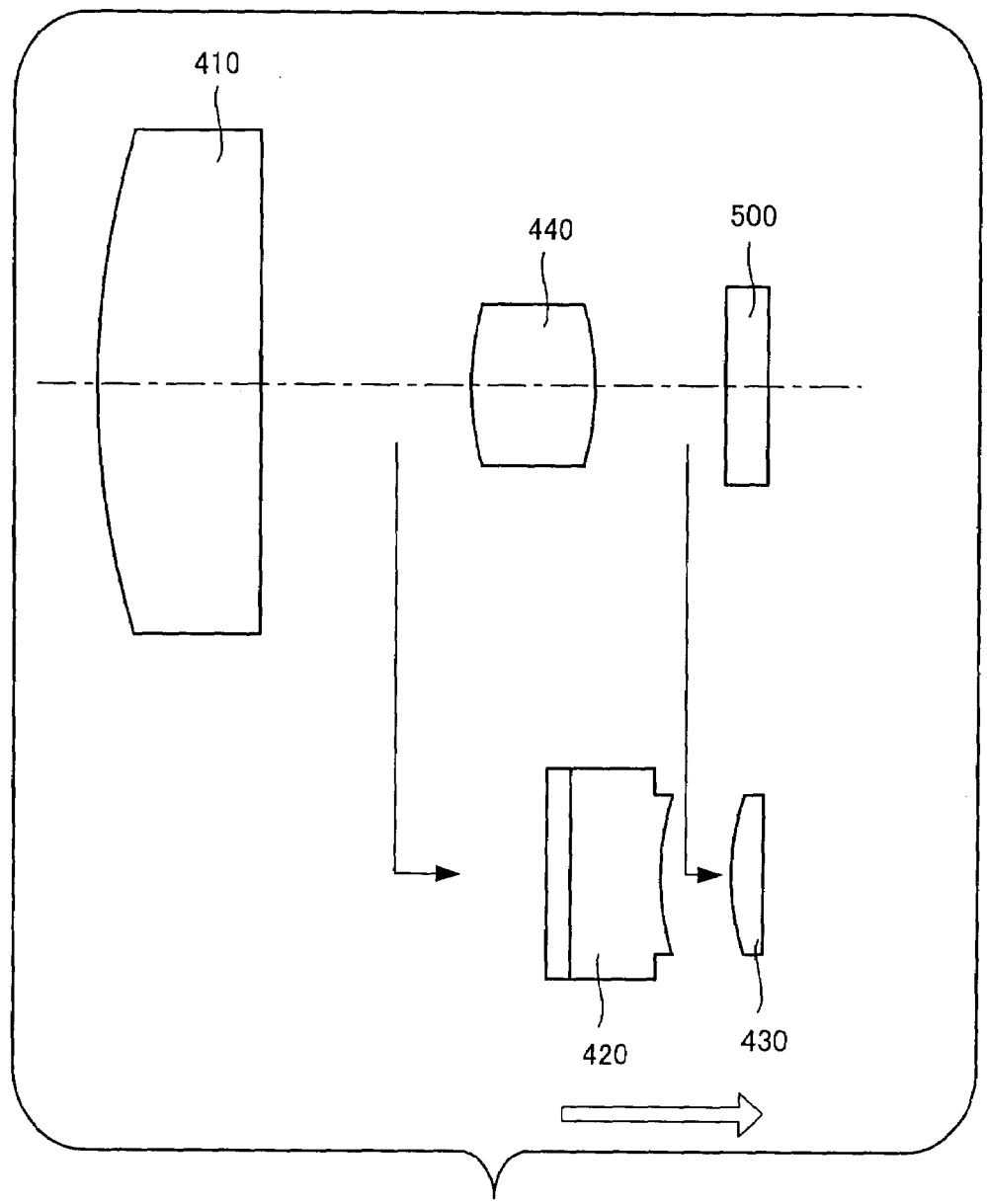
FIG. 22(f) is a diagram showing another lens arrangement of lens groups during collapse.
Figure 22G:
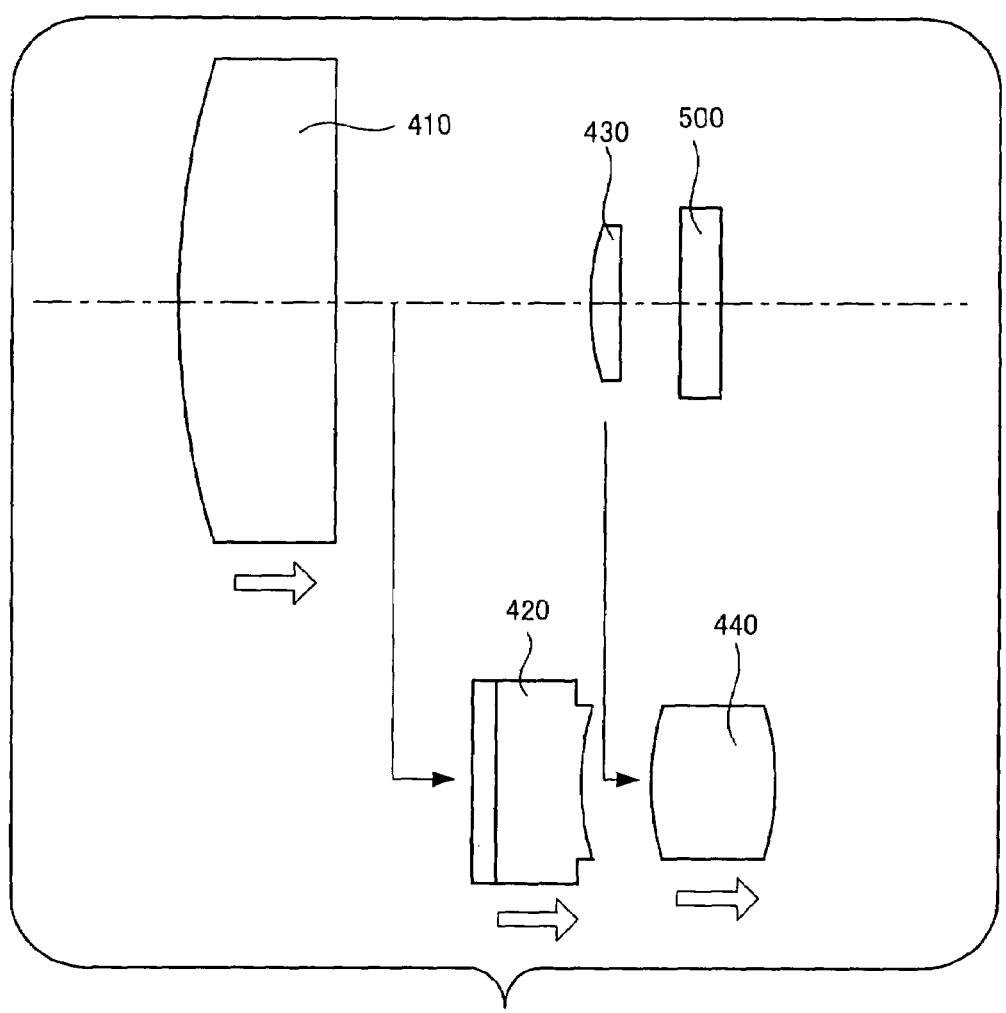
FIG. 22(g) is a diagram showing another lens arrangement of lens groups during collapse.
Figure 22H:
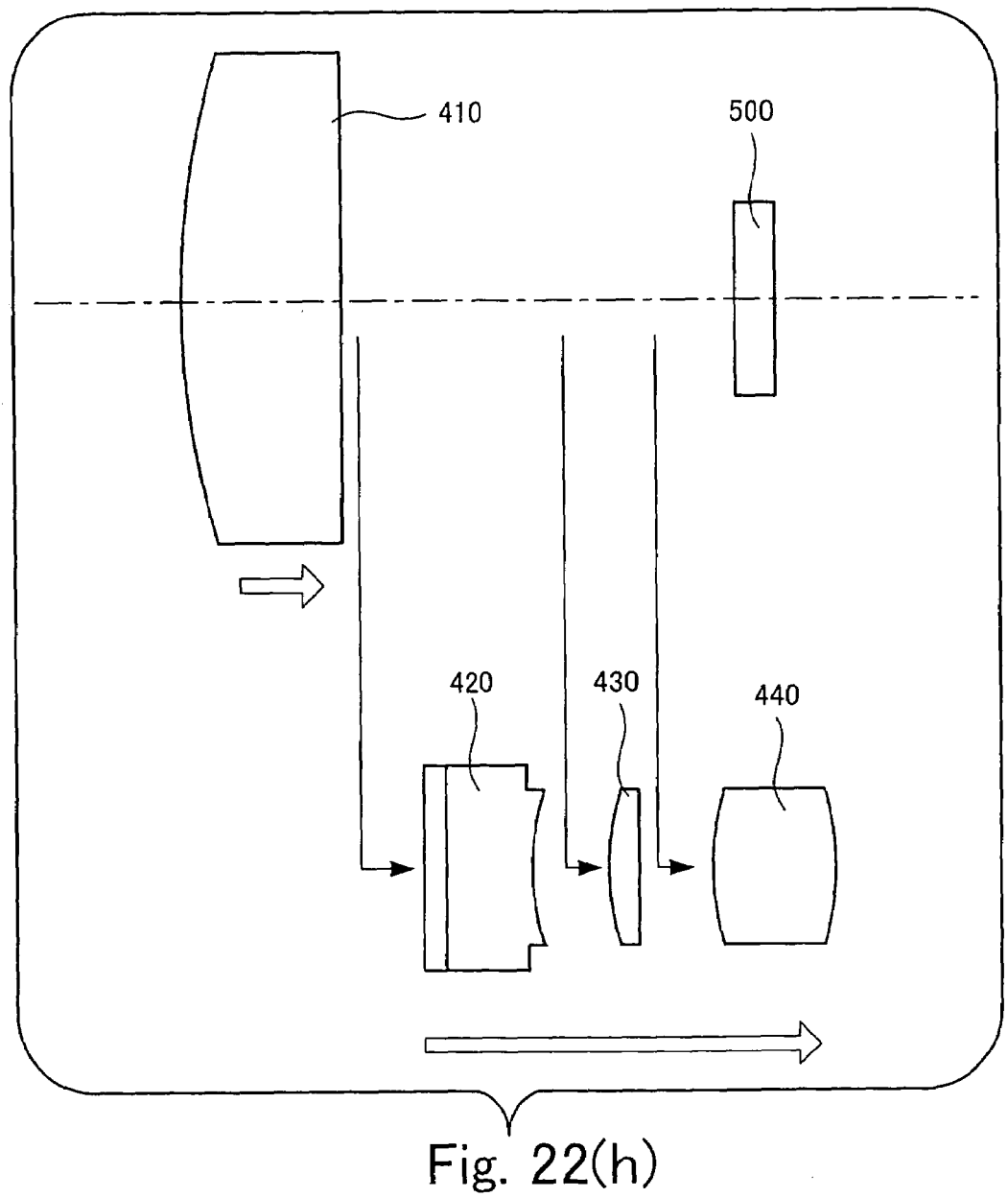
FIG. 22(h) is a diagram showing another lens arrangement of lens groups during collapse.
Figure 22I:
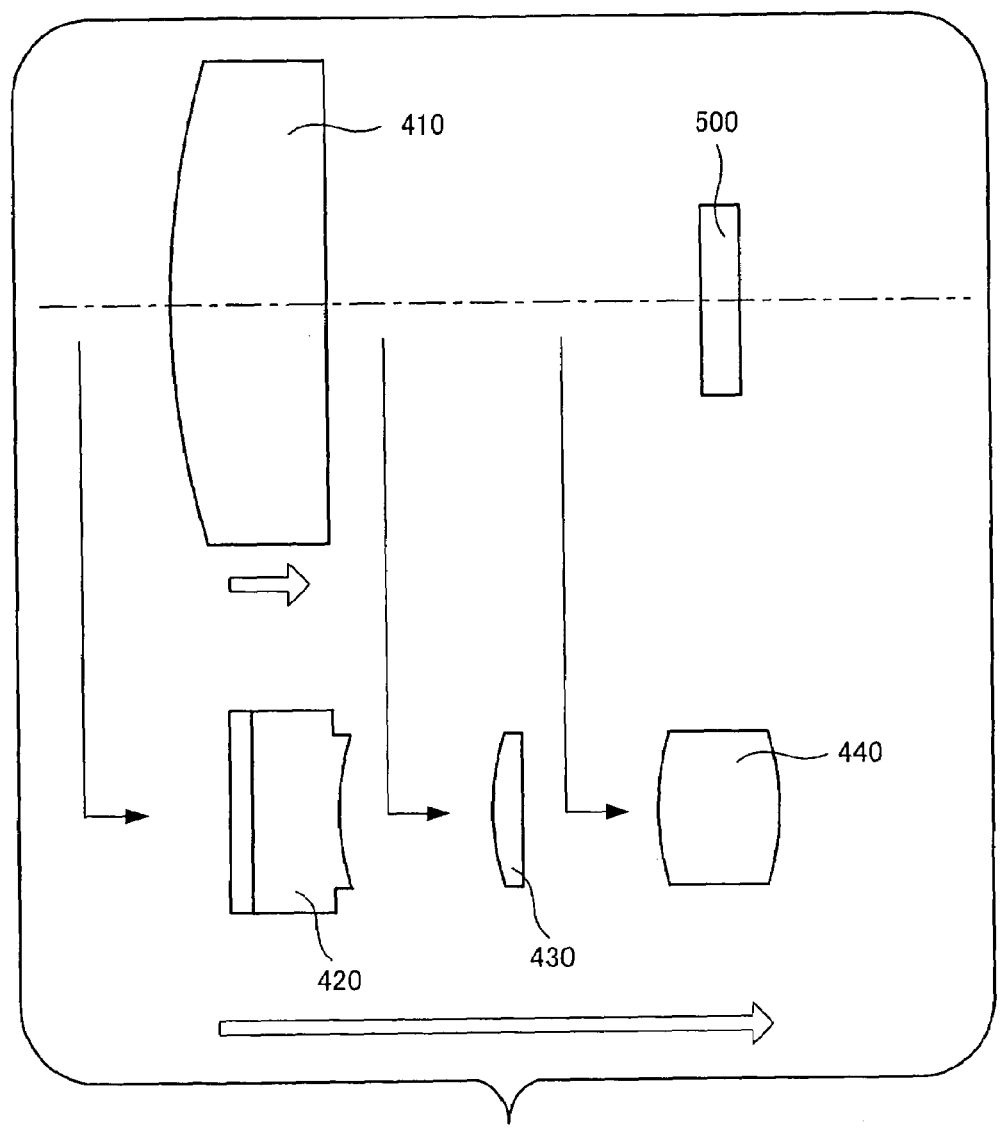
FIG. 22(i) is a diagram showing another lens arrangement of lens groups during collapse.
Figure 22J:
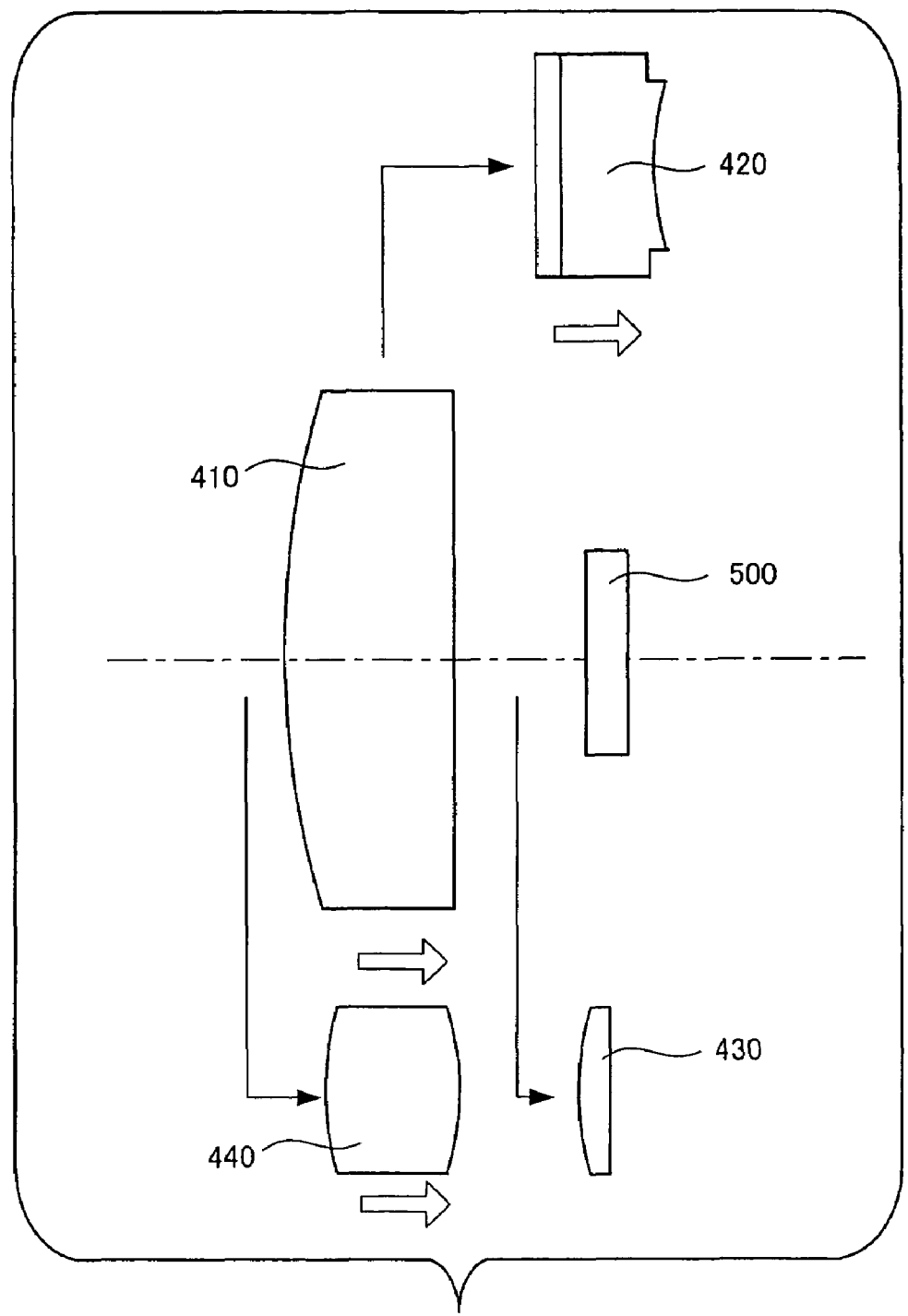
FIG. 22(j) is a diagram showing another lens arrangement of lens groups during collapse.
Figure 22K:
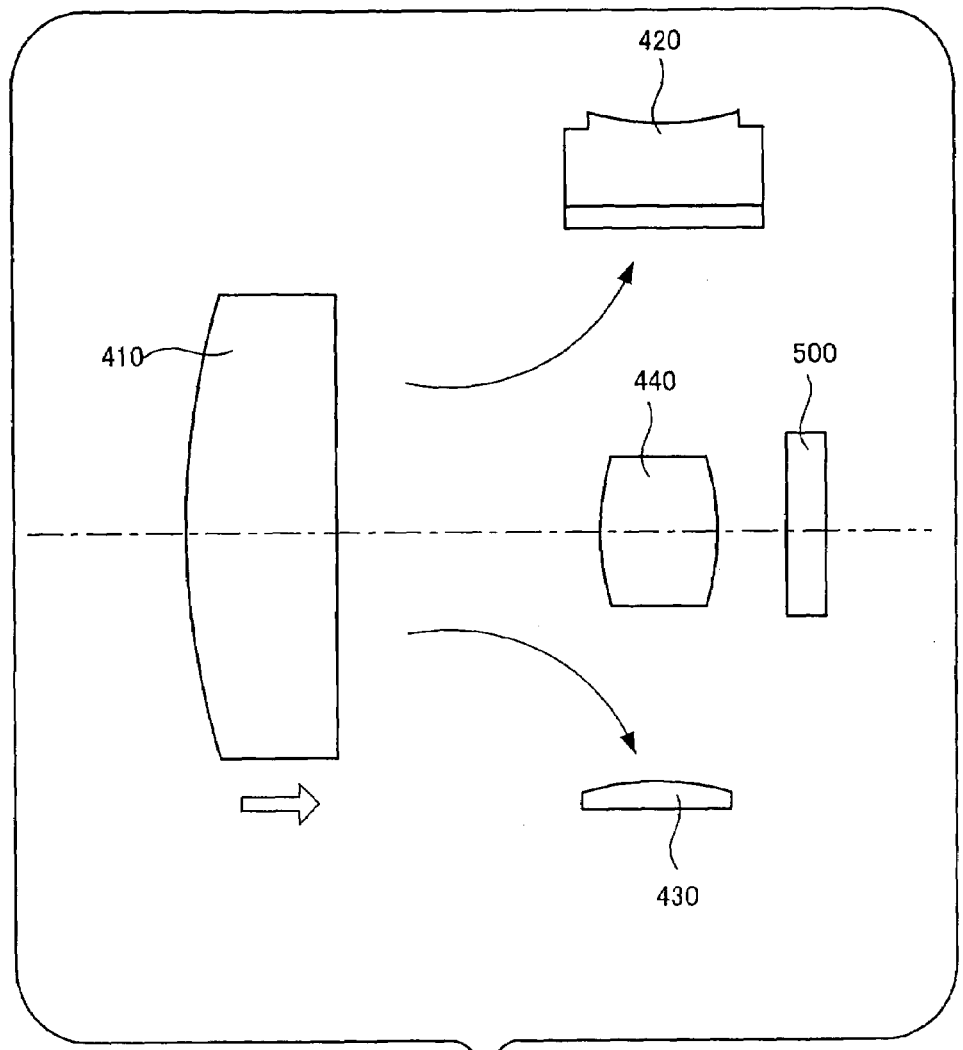
FIG. 22(k) is a diagram showing another lens arrangement of lens groups during collapse.
Figure 22I:
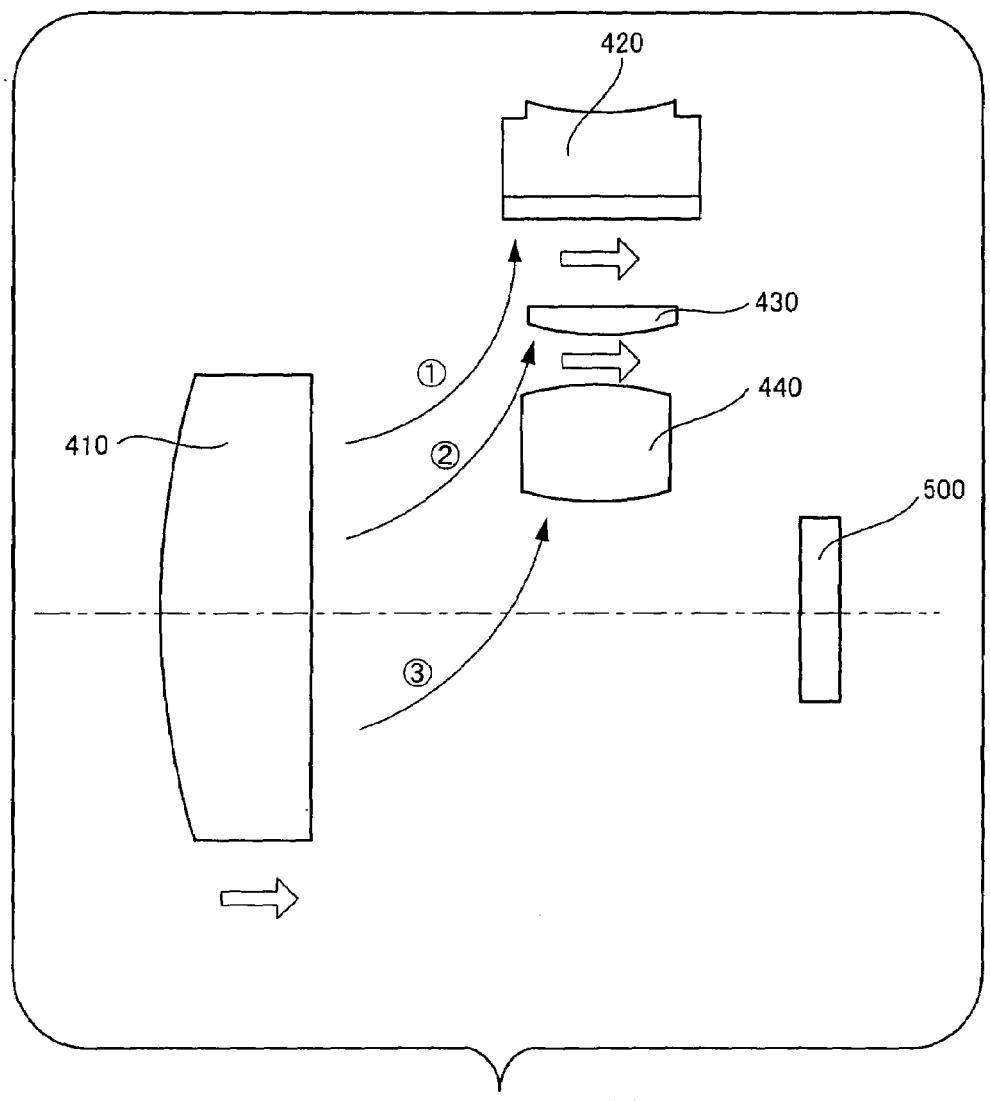
Figure 22M:
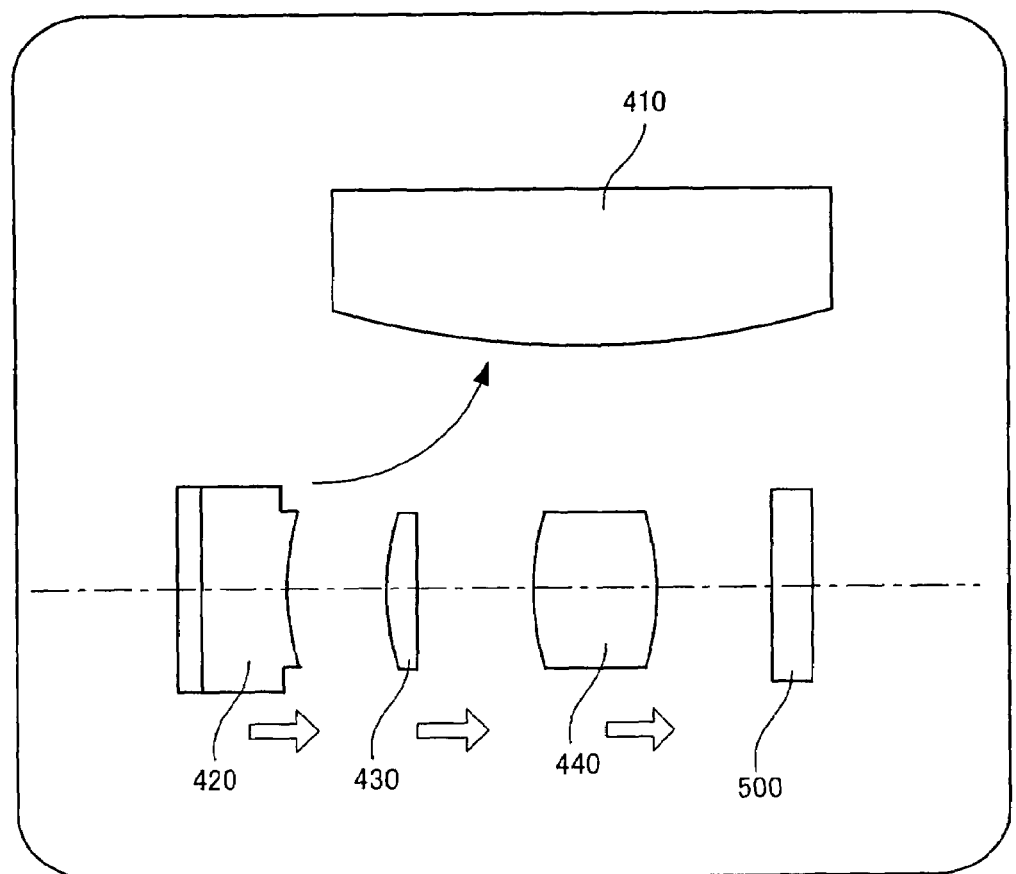
FIG. 22(m) is a diagram showing another lens arrangement of lens groups during collapse.
Figure 22N:
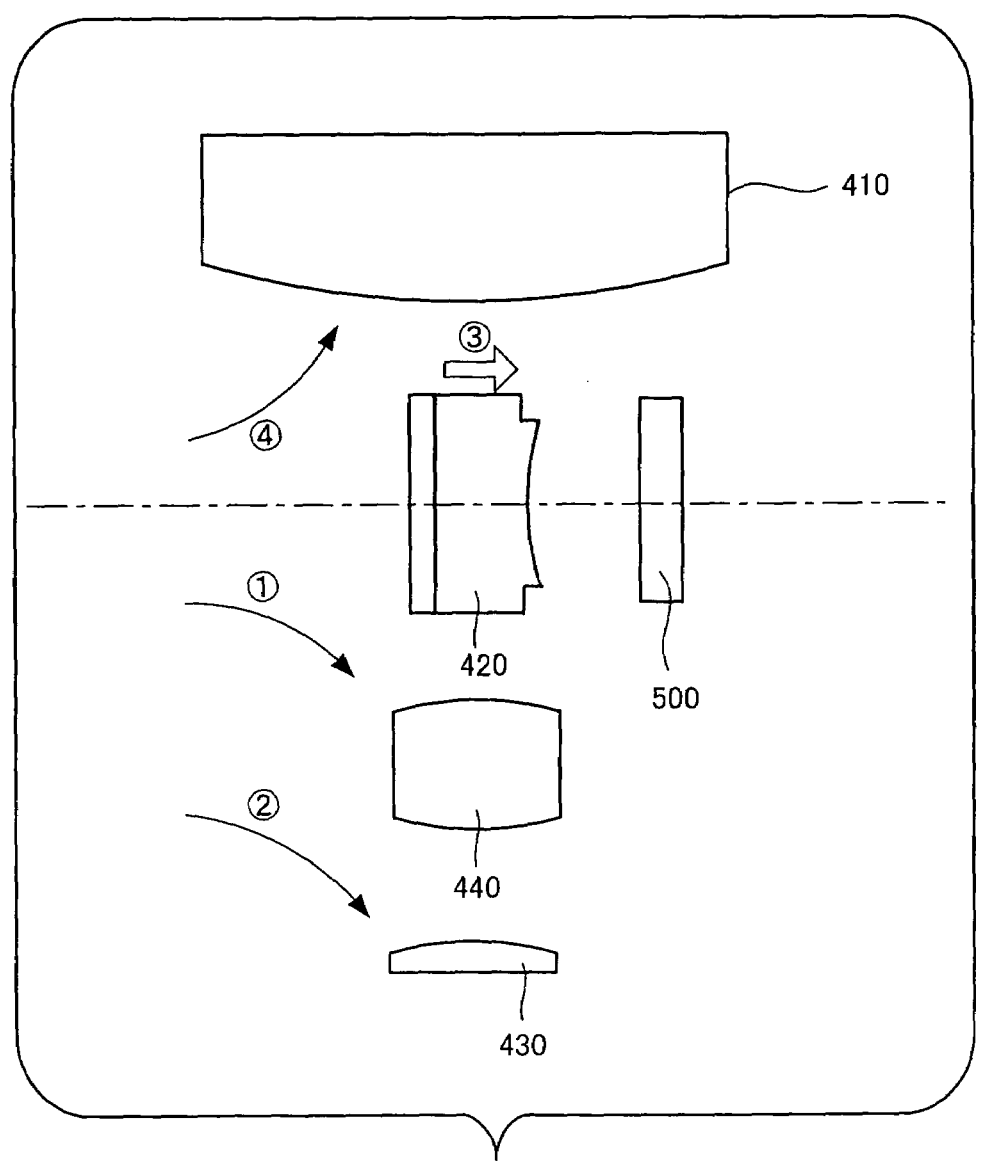
FIG. 22(n) is a diagram showing another lens arrangement of lens groups during collapse.
Figure 22O:
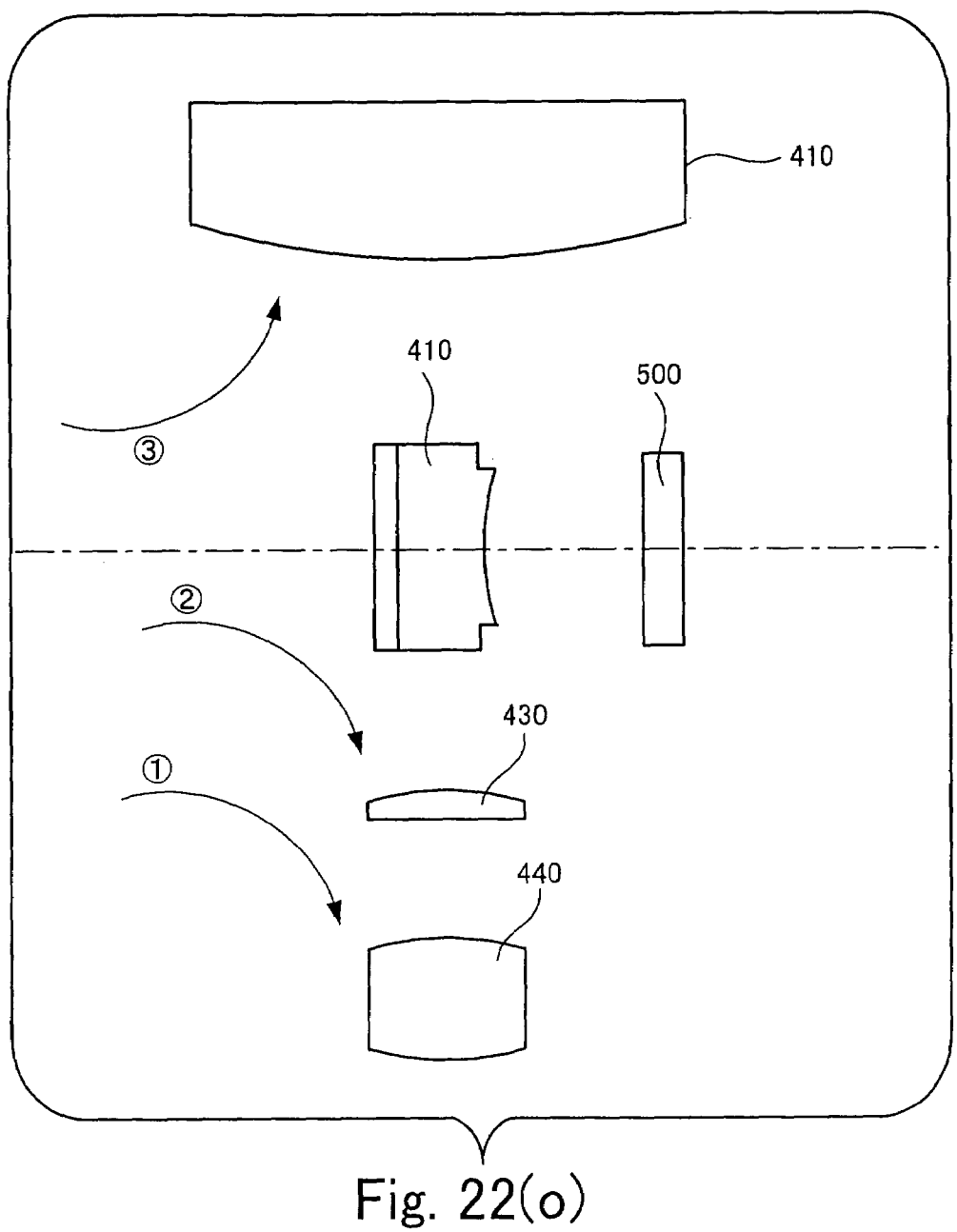
FIG. 22(o) is a diagram showing another lens arrangement of lens groups during collapse.
Figure 22P:
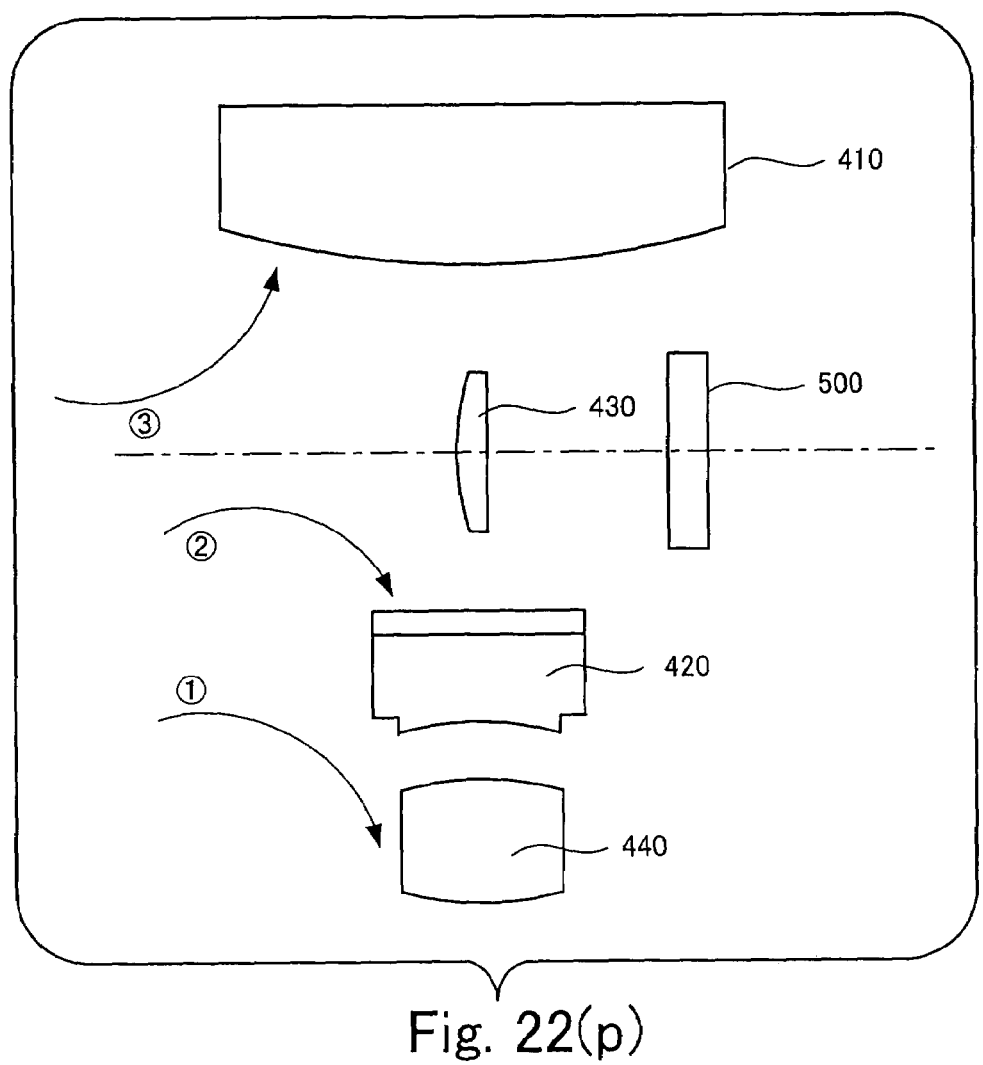
FIG. 22(p) is a diagram showing another lens arrangement of lens groups during collapse.
Figure 22Q:
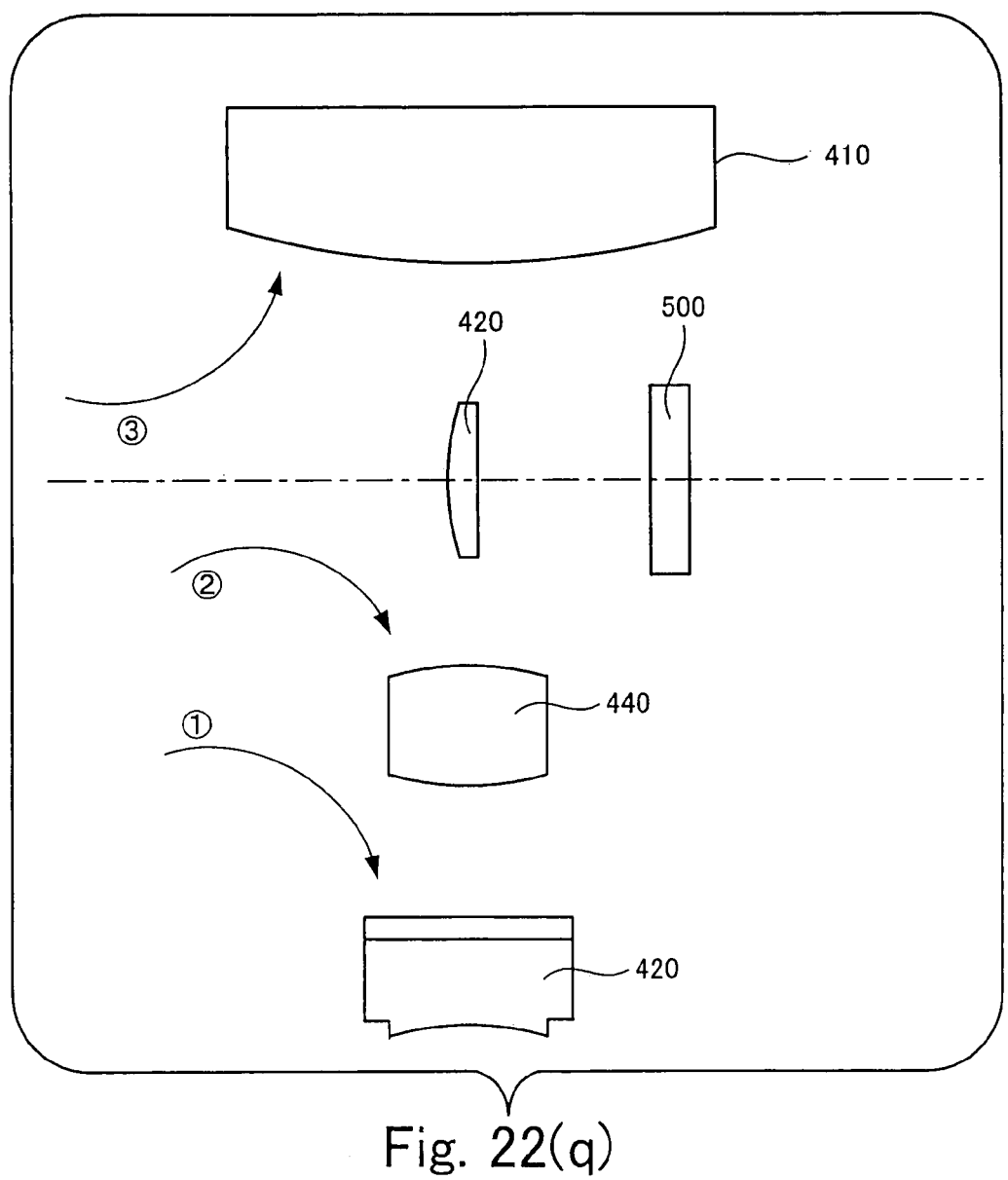
FIG. 22(q) is a diagram showing another lens arrangement of lens groups during collapse.
Figure 22R:
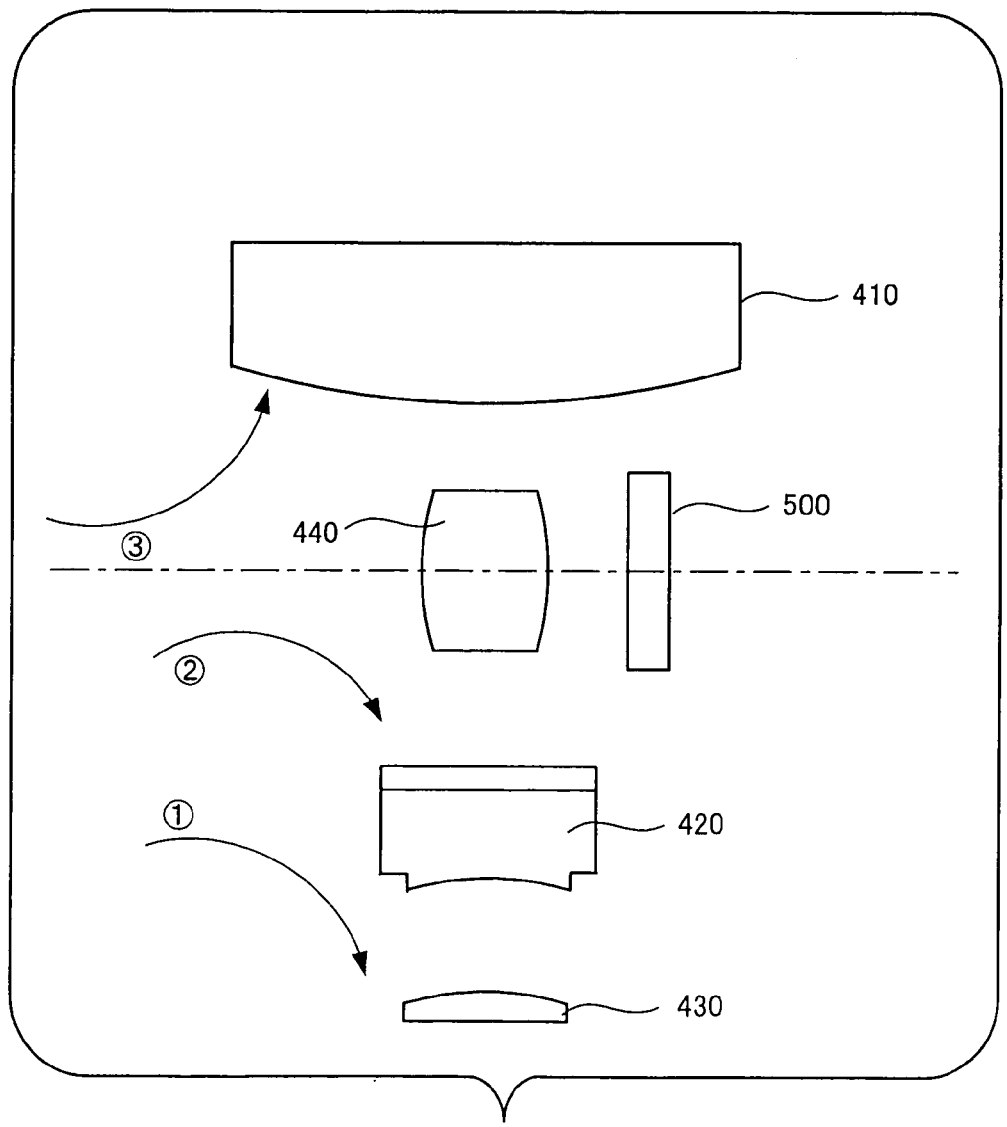
FIG. 22(r) is a diagram showing another lens arrangement of lens groups during collapse.
Figure 22S:
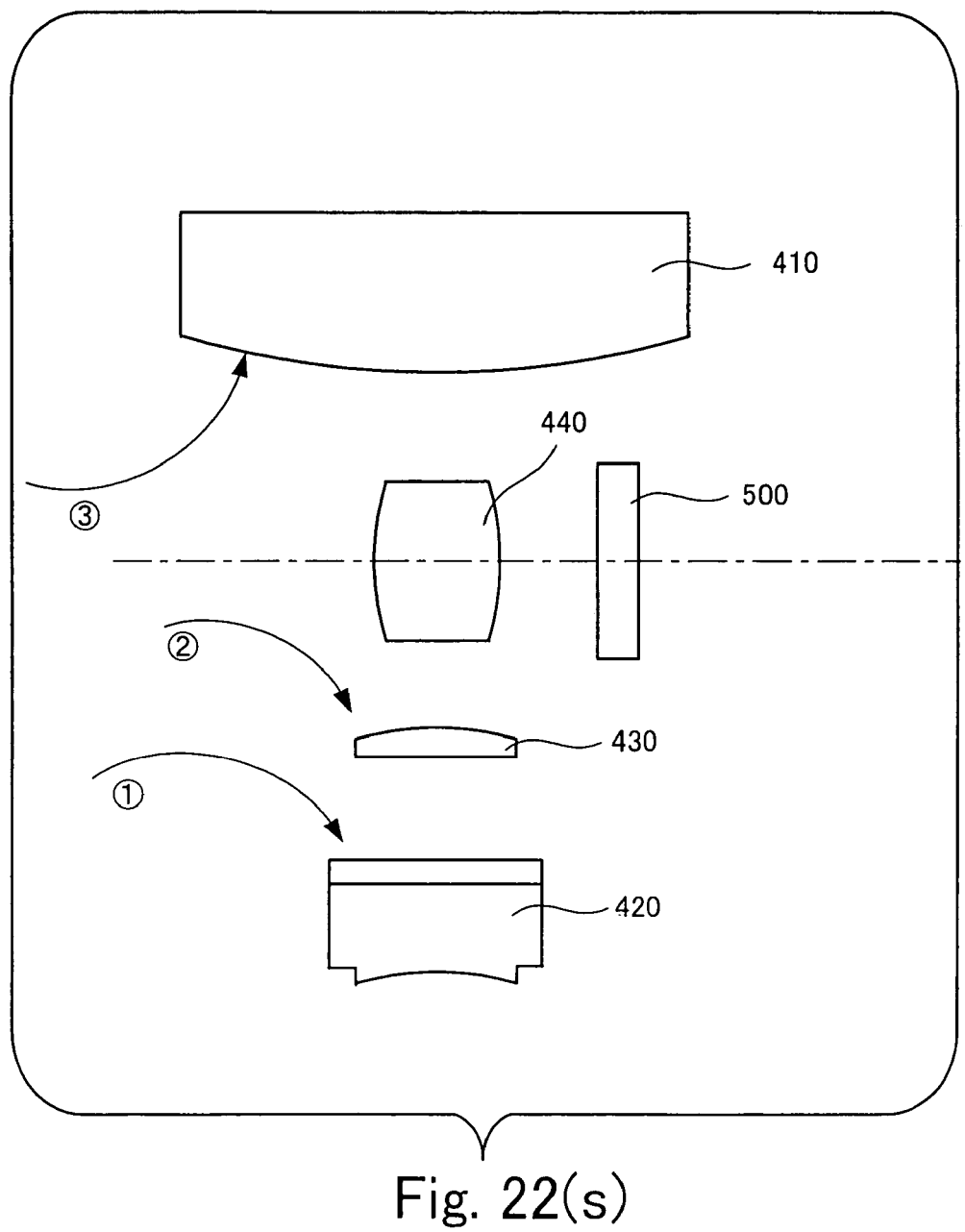
FIG. 22(s) is a diagram showing another lens arrangement of lens groups during collapse.

FIG. 21 is a diagram showing a lens arrangement of an image taking lens consisting of four groups during extension while FIGS. 22(*a*) to (*s*) are diagrams showing lens arrangements of an image taking lens consisting of four groups during collapse. FIGS. 22(*a*) to 22(*s*) show possible lens arrangements which can be used when retracting at least one of four lens groups from the photographic optical axis.

FIGS. 22(*a*) to 22(*j*) show lens arrangements which result when any of the first lens group, second lens group, third lens group, and fourth lens group is retracted from the photographic optical axis toward the circumference of the tubes in the lens barrel using the same advance/retract mechanism as in FIGS. 7 to 9. FIGS. 22(*k*) to 22(*s*) show lens arrangements which result when at least one of the first lens group, second lens group, third lens group, and fourth lens group is retracted along the length of the tubes by the advance/retract mechanism. FIGS. 22(*f*) to 22(*s*) show examples in which the lens barrel is further reduced by retracting lens groups into a recess by the side of a CCD.

As described above, the fourth lens group holding frame 441 and the advance/retract mechanism consisting of the extension member 4411 and the like provided on the fourth lens group holding frame are supported by the straight-ahead key ring 320, and when the lens barrel collapses, the extension member, retreating backward along the optical axis together with the straight-ahead key ring 320, engages with the switching protrusion 3134, thereby retracting the lens group. Thus, the advance/retract mechanism according to the present invention, in a broad sense, includes a cam mechanism.

To show that the at least one lens group turned by the advance/retract mechanism is caused to retreat further along the optical axis by the cam mechanism, the retreat caused by the cam mechanism is indicated by hollow arrows in distinction from the turning which is performed by the advance/retract mechanism and indicated by normal arrows.

The lens diameters of lens groups often differ from one another. Besides, they vary with the photographic optical system. Thus, when retracting lens groups of different diameters, it is sometimes necessary to retract them in a specific sequence. Numerals which indicate such sequences appear in some drawings herein.

In this way, it is possible to retract at least one of the lens groups from the photographic optical axis by turning it toward the circumference of the tubes in the lens barrel as well as to retract lens groups from the photographic optical axis in such a way as to be in parallel to the optical axis by turning them in the longitudinal direction of the lens barrel. Besides, since the lens group retracted from the optical axis by the advance/retract mechanism is caused to retreat further by being carried by the advance/retract mechanism, which retreats being supported by the straight-ahead key ring, it is possible to implement a far shorter lens barrel than conventional ones.

When two lens groups are retracted according to the advance/retract mechanism, the retracted lens groups and remaining lens groups may constitute respective photographic optical systems.

Figure 23:
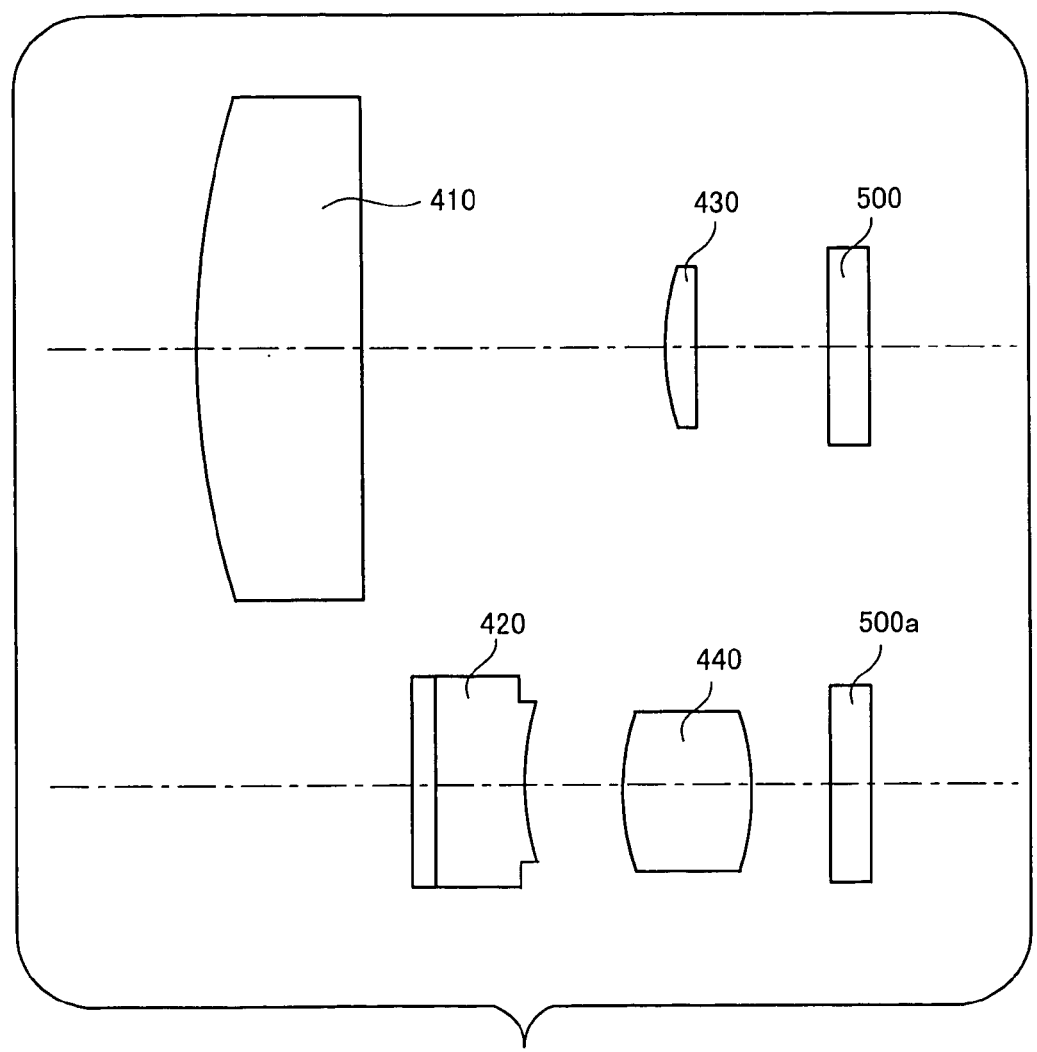
FIG. 23 is a diagram showing two photographic optical systems constituted of retracted lens groups and the remaining lens groups, respectively.

FIG. 23 is a diagram showing two photographic optical systems in that case.

As shown in FIG. 23, the retracted second and fourth groups constitute a photographic optical system and the remaining first and third groups constitute another photographic optical system. If a second image pickup device 500*a* is provided behind the photographic optical system of the retracted lens groups, a twin-lens photographic optical system results. Various extended configurations are conceivable if both retracted lens groups and remaining lens groups are used in this way instead of simply retracting lens groups.

In addition, since the above embodiments are described using a digital camera, the words "collapse" and "extend" are used to describe its lens barrel. However, the present invention is not limited to photographic apparatus such as digital camera and can be widely applied to optical apparatus having a lens consisting of multiple lens groups.

Since the present invention can be applied to optical apparatus having a lens unit consisting of multiple lens groups, such optical apparatus is described below as an example.

Figure 24:
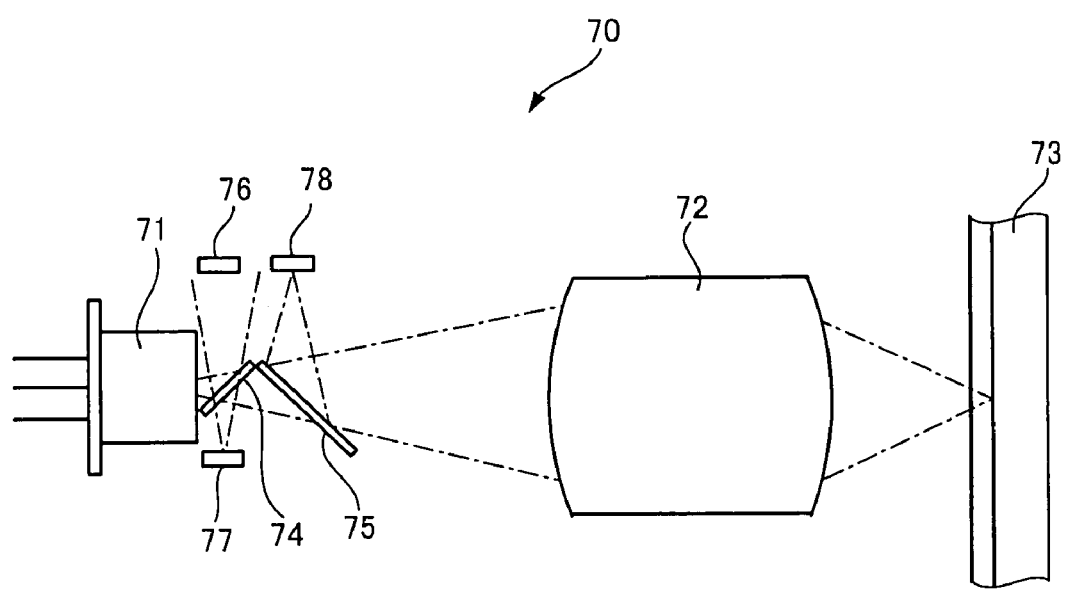
FIG. 24 is a diagram showing the configuration of an optical pickup apparatus as an example of the optical apparatus.

FIG. 24 is a diagram showing the configuration of an optical pickup apparatus as an example of the optical apparatus.

An optical pickup apparatus 70 shown in FIG. 16 is comprised of a semiconductor laser 71 and an optical system for guiding light emitted from the semiconductor laser 71 onto an optical disk 73. The optical system includes a lens unit 72 that is comprised of a lens consisting of the first lens group, the second lens group, the third lens group and the fourth lens group arranged in this order when viewed from ahead along the optical axis. The lens unit 72 has a tube extendable between the first state in which the tube length is relatively short and the second state in which the tube length is relatively long. The optical pickup apparatus 70 includes a lens advancing/retracting mechanism that retracts at least one of the multiple lens groups from the optical axis when the lens unit shifts from the second state to the first stated and advances the retracted lens group onto the optical axis when the lens unit shifts from the first state to the second stated.

A brief description of the operation performed by the optical pickup apparatus 70 shown in FIG. 24 is given below.

The optical pickup apparatus 70 focuses the light emitted from the semiconductor laser 71 on the optical disk 73 by using the optical system including the lens unit so as to record an image signal on the optical disk 73. In the optical pickup apparatus 70 shown in FIG. 16, part of the light emitted from the semiconductor laser 71 is reflected by a glass plate 74 arranged obliquely with respect to the light axis and detected by a light detector 76 so that a detection signal is generated. The detection signal is then sent back to a driving device (not shown) of the semiconductor laser so that the output level of the semiconductor laser is adjusted and the intensity of the light to be emitted is controlled. Also, in the optical pickup apparatus 70, light returned from the optical disk 73 is reflected by glass plates 74 and 75 and detected by light detectors 77 and 78 respectively so that a focus error signal and a tracking error signal are generated.

If the above lens unit is incorporated into such an optical apparatus, it is housed in the optical apparatus when unused to make the optical apparatus compact in size.

Figure 25:
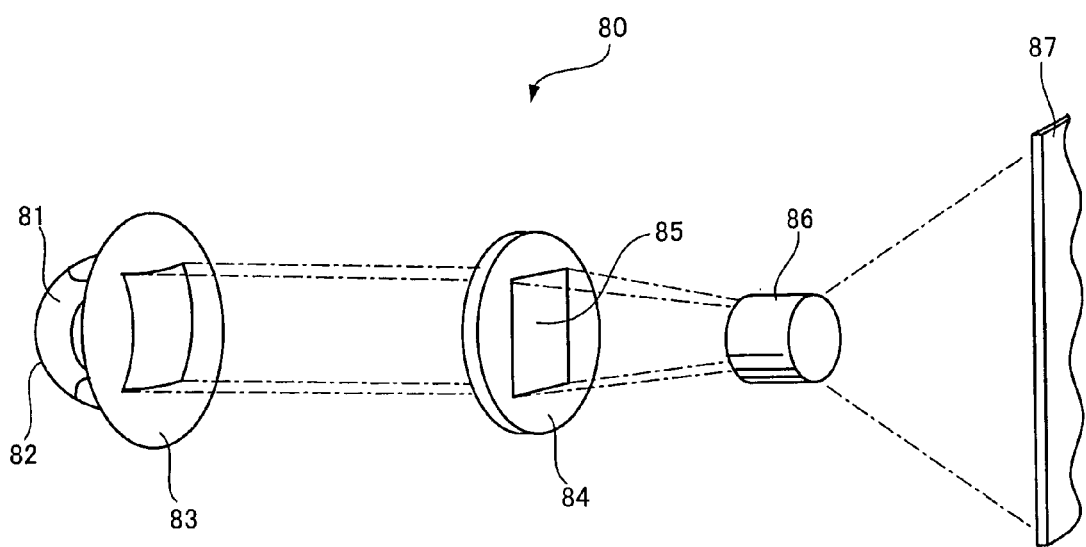
FIG. 25 is a diagram showing a liquid crystal projector 80 as another example of the optical apparatus.

FIG. 25 shows a liquid crystal projector 80 as another example of the optical apparatus.

As shown in FIG. 25, the liquid crystal projector 80 includes: a lamp 81; an oval reflector 82 that reflects white light emitted from the lamp 81 backward in the optical axis so as to make the white light going forward in the optical axis; a circular reflector 83 that has an irradiation hole and reflects light which is not reflected by the oval reflector 82 toward the oval reflector 82; a condensing lens 84 that changes the path of polarized light generated by the oval reflector 82 so as to condense it to a liquid crystal panel 85; the liquid crystal panel 85 that modulates light condensed by the condensing lens 84; and a projecting lens 86 that forms light of R, G and B modulated by the liquid crystal panel 85 on a screen 87. A lens unit of which structure is similar to that of the above-described lens barrel can be applied to the projecting lens 86. Then, as an optical apparatus, there is realized a liquid crystal projector having the projecting lens 86 housed therein when unused.

What is claimed is:

1. A lens barrel which is extendable and collapsible and holds a zoom lens comprising a plurality of lens groups, the lens barrel comprising:
   a first lens group holding frame which holds a first lens group that is the foremost of the plurality of lens groups composing the zoom lens and a second lens group holding frame which holds a second lens group that is the second foremost of the plurality of lens groups composing the zoom lens, wherein:
   the second lens group holding frame is spring-loaded forward along an optical axis, and
   the first lens group holding frame has a pushing section which pushes the second lens group holding frame along the optical axis during collapse and separates from the second lens group holding frame during extension.

2. The lens barrel according to claim 1, comprising:
   a fixed tube, a straight-ahead key member advanceably/retractably engaged with the fixed tube, a middle tube which rotatably engages with the straight-ahead key member and advances/retracts along with rotation due to cam engagement with the fixed tube, and a front tube which advanceably/retractably engages with the straight-ahead key member and advances/retracts along with rotation due to cam engagement with the middle tube,
   wherein the first lens group holding frame is fixed to the front tube.

3. The lens barrel according to claim 2, comprising a second lens group supporting frame which advances/retracts along with rotation of the middle tube due to cam engagement with the middle tube, wherein the second lens group holding frame is supported by the second lens group supporting frame, being spring-loaded forward along an optical axis.

4. The lens barrel according to claim 1, comprising:
   a second lens group retraction mechanism which retracts the second lens group from the optical axis of the zoom lens by turning the second lens group holding frame during collapse and advances the second lens group onto the optical axis during extension,
   wherein the pushing section pushes the retracted second lens group holding frame during collapse.

5. A photographic apparatus which takes photographs by capturing light from a subject entering through a zoom lens comprising a plurality of lens groups and held by an extendable/collapsible lens barrel, wherein:
   the lens barrel comprises a first lens group holding frame which holds a first lens group that is the foremost of the plurality of lens groups composing the zoom lens and a second lens group holding frame which holds a second lens group that is the second foremost of the plurality of lens groups composing the zoom lens,
   the second lens group holding frame is spring-loaded forward along an optical axis, and
   the first lens group holding frame has a pushing section which pushes the second lens group holding frame along the optical axis during collapse and separates from the second lens group holding frame during extension.

6. The photographic apparatus according to claim 5, comprising an image pickup device which generates image signals by capturing light from a subject entering through the zoom lens held by the lens barrel.

7. A lens barrel which holds a zoom lens comprising a first lens group, a second lens group, a third lens group, and a fourth lens group in this order when viewed from ahead along an optical axis, comprising:
   a lens advance/retract mechanism which retracts at least the fourth lens group of the zoom lens from a photographic optical axis during collapse and advances the retracted lens group onto the photographic optical axis during extension.

8. The lens barrel according to claim 7, wherein the fourth lens group acts as a focus lens.

9. The lens barrel according to claim 7, wherein the lens advance/retract mechanism retracts the fourth lens group from the photographic optical axis during collapse and retracts the second lens group to a place which coincides with the retracted fourth lens group when viewed along the optical axis.

10. The lens barrel according to claim 7, comprising an image pickup device which generates image signals by capturing light from a subject entering through the zoom lens held by the lens barrel.

11. A photographic apparatus which takes photographs by capturing light from a subject entering through a zoom lens held by a lens barrel and comprising a first lens group, a second lens group, a third lens group, and a fourth lens group in this order when viewed from ahead along an optical axis, comprising:
   a lens advance/retract mechanism which retracts at least the fourth lens group of the zoom lens from a photographic optical axis during collapse and advances the retracted lens group onto the photographic optical axis during extension.

12. The photographic apparatus according to claim 11, wherein the fourth lens group acts as a focus lens.

13. The photographic apparatus according to claim 11, wherein the lens advance/retract mechanism retracts the fourth lens group from the photographic optical axis during collapse and retracts the second lens group to a place which coincides with the retracted fourth lens group when viewed along the optical axis.

14. The photographic apparatus according to claim 11, comprising an image pickup device which generates image signals by capturing light from a subject entering through the zoom lens held by the lens barrel.

15. A lens barrel which includes an image taking lens comprising a plurality of lens groups and which is capable of changing a barrel length thereof between a housed state of relatively short length and a photographing state of relatively long length, the lens barrel comprising:
a first lens group holding frame which holds a first lens group that is the foremost of the plurality of lens groups and a second lens group holding frame which holds a second lens group that is the second foremost of the plurality of lens groups, wherein:
the second lens group holding frame is urged by urging means forward along an optical axis, and
the first lens group holding frame has a pushing section which pushes the second lens group holding frame along the optical axis during transition to the housed state and separates from the second lens group holding frame during the photographing state.

16. The lens barrel according to claim 15, comprising:
a fixed tube, a straight-ahead key member advanceably/retractably engaged with the fixed tube, a middle tube which rotatably engages with the straight-ahead key member and advances/retracts along with rotation due to cam engagement with the fixed tube, and a front tube which advanceably/retractably engages with the straight-ahead key member and advances/retracts along with rotation due to cam engagement with the middle tube,
wherein the first lens group holding frame is fixed to the front tube.

17. The lens barrel according to claim 16, comprising a second lens group supporting frame which advances/retracts along with rotation of the middle tube due to cam engagement with the middle tube, wherein the second lens group holding frame is supported by the second lens group supporting frame, being urged forward along an optical axis by the urging means.

18. The lens barrel according to claim 15, comprising:
a second lens group retraction mechanism which retracts the second lens group from the optical axis of the image taking lens by turning the second lens group holding frame during transition to the housed state and advances the second lens group onto the optical axis during transition to the photographing state,
wherein the pushing section pushes the retracted second lens group holding frame during collapse.

19. A lens barrel which holds an image taking lens comprising a first lens group, a second lens group, a third lens group, and a fourth lens group in this order when viewed from ahead along an optical axis and which is capable of changing a barrel length thereof between a housed state of relatively short length and a photographing state of relatively long length, comprising:
a lens advance/retract mechanism which retracts at least the fourth lens group from a photographic optical axis during transition to the housed state and advances the retracted lens group onto the photographic optical axis during transition to the photographing state.

20. The lens barrel according to claim 19, wherein the fourth lens group acts as a focus lens.

21. The lens barrel according to claim 19, wherein the lens advance/retract mechanism retracts the fourth lens group from the photographic optical axis during transition to the housed state and retracts the second lens group to a place which coincides with the retracted fourth lens group when viewed along the optical axis.

22. The lens barrel according to claim 19, comprising an image pickup device which generates image signals by capturing light from a subject entering through the image taking lens held by the lens barrel.

23. A lens barrel which holds an image taking lens comprising a first lens group, a second lens group, a third lens group, and a fourth lens group in this order when viewed from ahead along an optical axis and which is capable of changing a barrel length thereof between a housed state of relatively short length and a photographing state of relatively long length, comprising:
a lens advance/retract mechanism which retracts at least the third lens group lens from a photographic optical axis during transition to the housed state and advances the retracted lens group onto the photographic optical axis during transition to the photographing state.

24. The lens barrel according to claim 23, wherein the third lens group acts as a lens for zooming.

25. The lens barrel according to claim 23, comprising an image pickup device which generates image signals by capturing light from a subject entering through the image taking lens held by the lens barrel.

26. A photographic apparatus which takes photographs by capturing light from a subject entering through an image taking lens held by a lens barrel and comprising a first lens group, a second lens group, a third lens group, and a fourth lens group in this order when viewed from ahead along an optical axis, the lens barrel being capable of changing a barrel length thereof between a housed state of relatively short length and a photographing state of relatively long length, the photographic apparatus comprising:
a lens advance/retract mechanism which retracts at least the third lens group from a photographic optical axis during transition to the housed state and advances the retracted lens group onto the photographic optical axis during transition to the photographing state.

27. The photographic apparatus according to claim 26, wherein the fourth lens group acts as a focus lens.

28. The photographic apparatus according to claim 26, wherein the third lens group acts as a lens for zooming.

29. The photographic apparatus according to claim 26, comprising an image pickup device which generates image signals by capturing light from a subject entering through the image taking lens held by the lens barrel.

30. A lens barrel which holds an image taking lens comprising a first lens group, a second lens group, a third lens group, and a fourth lens group in this order when viewed from ahead along an optical axis and which is capable of changing a barrel length thereof between a housed state of relatively short length and a photographing state of relatively long length, comprising:
a lens advance/retract mechanism which retracts at least one of the lens groups from a photographic optical axis during transition to the housed state and advances the retracted lens group onto the photographic optical axis during transition to the photographing state.

31. The lens barrel according to claim 30, comprising an image pickup device which generates image signals by capturing light from a subject entering through the image taking lens held by the lens barrel.

32. A photographic apparatus which takes photographs by capturing light from a subject entering through an image taking lens held by a lens barrel and comprising a first lens group, a second lens group, a third lens group, and a fourth lens group in this order when viewed from ahead along an optical axis, the lens barrel being capable of changing a barrel length thereof between a housed state of relatively short length and a photographing state of relatively long length, the photographic apparatus comprising:
a lens advance/retract mechanism which retracts at least one of the lens groups from a photographic optical axis during transition to the housed state and advances the retracted lens group onto the photographic optical axis during transition to the photographing state.

33. The photographic apparatus according to claim 32, comprising an image pickup device which generates image signals by capturing light from a subject entering through the image taking lens held by the lens barrel.

34. An optical apparatus which holds a lens unit that includes a lens comprising a first lens group, a second lens group, a third lens group, and a fourth lens group in this order when viewed from ahead along an optical axis, the lens unit being capable of changing a barrel length thereof between a first state of relatively short length and a second state of relatively long length, the optical apparatus comprising:

a lens advance/retract mechanism which retracts at least one of the lens groups from a photographic optical axis during transition to the first state and advances the retracted lens group onto the photographic optical axis during transition to the second state.

* * * * *